United States Patent
Kirchhoff et al.

(10) Patent No.: US 9,834,618 B2
(45) Date of Patent: Dec. 5, 2017

(54) PROCESS FOR THE PRODUCTION OF WATER AND SOLVENT-FREE POLYMERS

(71) Applicant: LANXESS International SA, Granges-Paccot (CH)

(72) Inventors: Jorg Kirchhoff, Cologne (DE); Werner Backer, Wipperfurth (DE); Rolf Feller, Mettmann (DE); Paul Wagner, Dusseldorf (DE); Hanns-Ingolf Paul, Leverkusen (DE); John Lovegrove, Sarnia (CA)

(73) Assignee: ARLANXEO Deutschland GmbH, Dormagen (DE)

( * ) Notice: Subject to any disclaimer, the term of this patent is extended or adjusted under 35 U.S.C. 154(b) by 39 days.

(21) Appl. No.: 14/603,482

(22) Filed: Jan. 23, 2015

(65) Prior Publication Data
US 2015/0203600 A1  Jul. 23, 2015

Related U.S. Application Data

(63) Continuation of application No. 13/635,803, filed as application No. PCT/EP2011/054415 on Mar. 23, 2011, now abandoned.

(30) Foreign Application Priority Data

Mar. 24, 2010 (EP) ..................................... 10003141
Mar. 25, 2010 (EP) ..................................... 10157705

(51) Int. Cl.
| | | |
|---|---|---|
| B29C 47/76 | (2006.01) |
| C08L 23/28 | (2006.01) |
| C08F 236/08 | (2006.01) |
| C08F 236/16 | (2006.01) |
| C08C 2/02 | (2006.01) |
| B29C 47/50 | (2006.01) |
| C08C 2/00 | (2006.01) |
| C08F 6/00 | (2006.01) |
| C08F 236/02 | (2006.01) |
| B29C 47/36 | (2006.01) |
| B29C 47/38 | (2006.01) |
| B29C 47/60 | (2006.01) |
| B29B 7/38 | (2006.01) |
| B29B 7/74 | (2006.01) |
| B29B 7/82 | (2006.01) |
| B29B 7/84 | (2006.01) |
| B29C 47/00 | (2006.01) |
| B29B 9/06 | (2006.01) |

(52) U.S. Cl.
CPC .................. *C08C 2/02* (2013.01); *B29B 7/38* (2013.01); *B29B 7/7461* (2013.01); *B29B 7/7466* (2013.01); *B29B 7/7495* (2013.01); *B29B 7/82* (2013.01); *B29B 7/845* (2013.01); *B29C 47/364* (2013.01); *B29C 47/366* (2013.01); *B29C 47/369* (2013.01); *B29C 47/38* (2013.01); *B29C 47/50* (2013.01); *B29C 47/6056* (2013.01); *B29C 47/6062* (2013.01); *B29C 47/767* (2013.01); *C08C 2/00* (2013.01); *C08F 6/003* (2013.01); *C08F 236/02* (2013.01); *B29B 9/065* (2013.01); *B29C 47/0009* (2013.01); *Y02P 70/263* (2015.11)

(58) Field of Classification Search
CPC ........ C08L 23/283; C08F 6/003; C08F 6/283; C08F 236/08; C08F 236/16; B29C 47/76; B29C 47/767; C29C 47/76
See application file for complete search history.

(56) References Cited

U.S. PATENT DOCUMENTS

| | | | | |
|---|---|---|---|---|
| 2,833,750 | A * | 5/1958 | Vickers .................. | B29B 13/00 159/2.2 |
| 4,822,545 | A * | 4/1989 | Kresge ................ | B29C 47/8895 264/141 |
| 5,306,452 | A * | 4/1994 | Todd ....................... | B29C 47/38 264/102 |
| 5,442,041 | A * | 8/1995 | Mallikarjun ............ | C08F 6/001 264/101 |
| 5,670,582 | A * | 9/1997 | Chung ..................... | C08F 8/22 525/333.4 |
| 6,517,335 | B1 * | 2/2003 | Long ..................... | B29C 47/762 425/135 |
| 8,519,093 | B2 * | 8/2013 | Diener .................... | B01D 1/14 528/480 |

FOREIGN PATENT DOCUMENTS

| | | | | |
|---|---|---|---|---|
| WO | WO 2010006983 A1 * | 1/2010 | ............... | C08F 8/20 |
| WO | WO 2010089137 A2 * | 8/2010 | ............... | B01D 1/14 |

* cited by examiner

*Primary Examiner* — Brieann R Johnston

(57) ABSTRACT

The present invention relates to water and solvent-free polymers, in particular water and solvent-free synthetic rubber products like non-halogenated and halogenated butyl rubber products as well as a process for the production thereof. The invention further relates to a device suitable to accomplish said process.

14 Claims, 10 Drawing Sheets

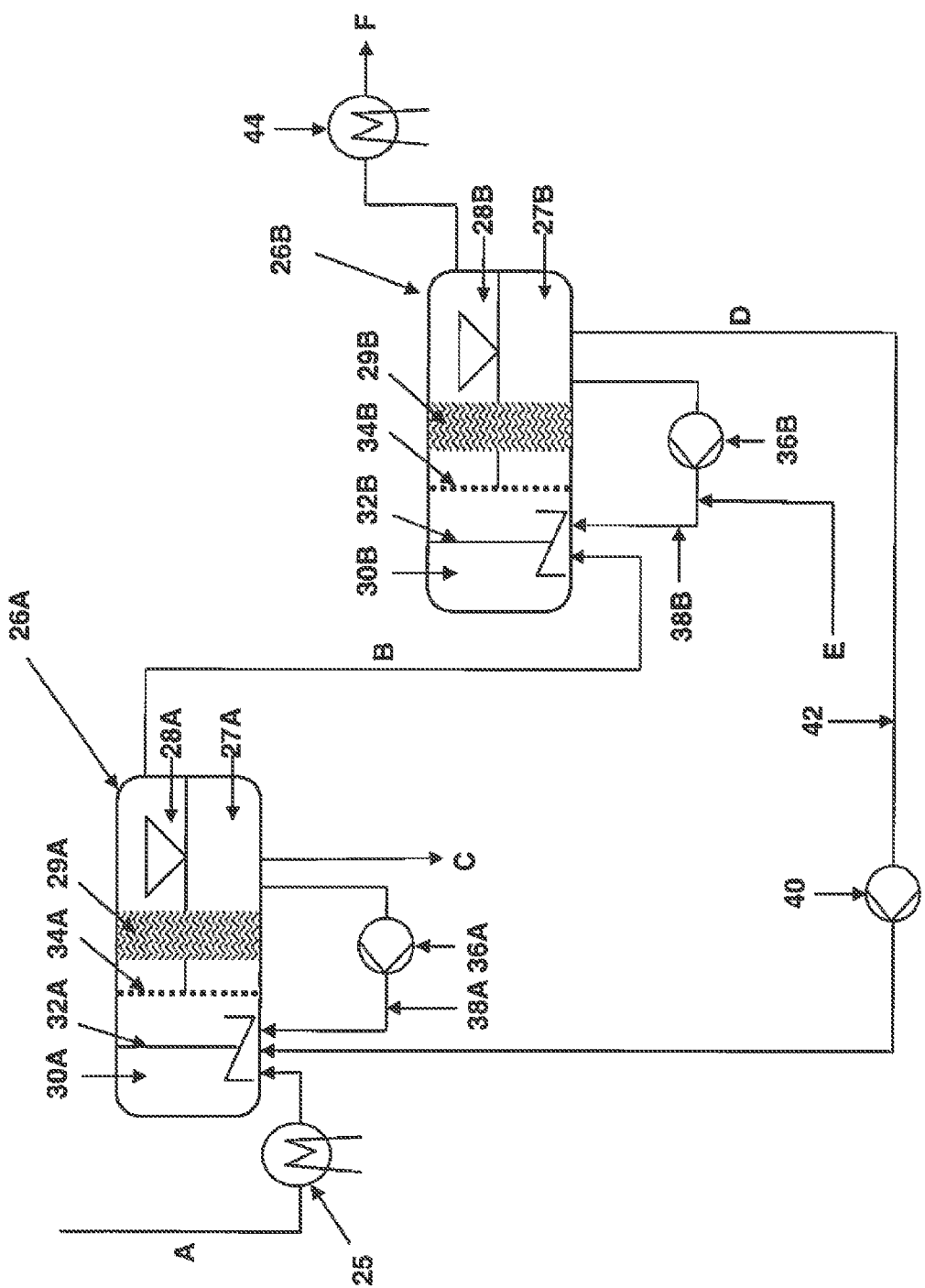

PROCESS FOR THE PRODUCTION OF WATER AND SOLVENT-FREE POLYMERS

This application is a continuation of pending U.S. patent application Ser. No. 13/635,803, filed Apr. 26, 2013, with the same title, which claims the right of priority under 35 U.S.C. §119 (a)-(d) and 35 U.S.C. §365 of International Application No. PCT/EP2011/054415, filed Mar. 23, 2011, which is entitled to the right of priority of European Patent Applications Nos. 10003141 filed Mar. 24, 2010, and 10157705.4, filed Mar. 25, 2010, the contents of which are hereby incorporated by reference in their entirety.

The present invention relates to water and solvent-free polymers, in particular water and solvent-free synthetic rubber products like non-halogenated and halogenated butyl rubber products as well as a process for the production thereof. The invention further relates to a device suitable to accomplish said process.

Synthetic rubbers have important industrial uses and are typically produced by the (co)polymerization of monomers, which is typically carried out via slurry, emulsion or solution processes. Examples of synthetic rubbers include butyl rubbers and halogenated butyl rubbers, polyisobutylene, ethylene propylene diene M-class rubbers (EPDM), nitrile butadiene rubbers (NBR) and styrene-butadiene rubbers (SBR).

After the (co)polymerization, the reactor discharge mixture contains at least the polymer, solvents, residual monomers and the catalyst. To recover the polymer, the discharge stream is typically treated with steam and hot water. Most of the solvent and the unreacted monomers are thereby flashed off. One disadvantage of the contact with steam and water is, that synthetic rubbers are coagulated. The rubber polymers are then present in the form of wet crumbs in water. Most of the water is then be separated by draining, followed e.g. by the application of drying extruders and a final vacuum drying step.

Copolymerization of isobutene and isoprene, which leads to butyl rubber, for example is carried out industrially at low temperatures of approximately −60° C. to 100° C. to obtain high molar masses. The slurry process uses chloromethane as a diluent while the solution process uses an inert hydrocarbon as a solvent. After the polymerization, the butyl rubber polymer is present either as a slurry in chloromethane or as a homogeneous solution in a hydrocarbon. Unreacted monomers are also present in the reactor discharge mixture. The butyl rubber polymer needs to be recovered and isolated from the diluent or solvent.

In the slurry process, the polymerization reactor discharge stream is treated with steam and hot water in a flash drum. Most of the chloromethane and the unreacted monomers are thereby flashed off and the water is separated from the vapors by condensation. When the polymer from the reactor is to be processed further, such as by halogenations, the butyl rubber product may be recovered directly as a solution by discharging the reactor content into a hot solvent such as hexane. The chloromethane is evaporated after this stage and a further stripping stage is applied to remove remaining monomer residues.

In the solution process, an inert hydrocarbon solvent and an aluminium alkyl halide catalyst are applied during the polymerization step. The remaining monomers are then removed from the reactor solution in a distillation stripping process. After this distillation step, the butyl rubber polymer is present as a homogeneous solution in a hydrocarbon. This solution can either be processed further, such as being subjected to a halogenation step, or the butyl rubber polymer can be isolated directly from the solution. The isolation of the butyl rubber from solution is similar to that of the slurry process and also involves contact with steam and hot water, whereby the polymer coagulated. The butyl rubber polymer is then present in the form of wet crumbs in water (6 to 10 wt % polymer in water). To counteract the coagulation, salts of fatty acids are added in the flash drum containing the butyl rubber crumbs in water following the coagulation/steam stripping process. After the addition of additives, butyl rubber is then converted into the final commercial bale form through further drying. The drying is typically effected by draining, followed by the application of drying extruders and a final drying step in a fluidized bed.

A commercially important chemical modification of butyl rubber is halogenation which leads to chlorinated and brominated butyl rubber, hereinafter also denoted as halobutyl rubbers or individually as bromobutyl rubber or chlorobutyl rubber.

Halobutyl rubber is technically produced by contacting a solution of regular butyl rubber in an alkane with chlorine or bromine in an agitated vessel. Said solution is generally denoted as cement. Unreacted halogen and hydrogen halide formed as byproduct are neutralized by the addition of a caustic solution. Additives can also be incorporated at that stage. The resulting solution is then steam-stripped to remove the solvent, thereby coagulating the rubber into a solid product. The solid product is generally recovered as a 5 to 12% slurry in water. Stabilizers and/or antioxidants are added to the halogenated butyl rubber immediately before recovery. The halogenated butyl rubber is then finished using mechanical drying equipment in a process analogous to that used for regular butyl rubber; however, because of the greater reactivity of the halogenated product, less severe conditions are employed.

The aforementioned processes for coagulation and steam stripping suffer from very high energy consumption. A large amount of steam is necessary not only to evaporate the solvent, but also to heat and maintain the complete water content of the shipping drums at a high temperature. Additional steam addition is also necessary to strip off residual amounts of solvent by lowering the partial pressure of the solvent in the stripping drum.

The aforementioned processes also utilize a large amount of water because the concentration of butyl rubber in the slurry after coagulation is generally only 5 to 12% by weight and only 5% to 20% for halogenated butyl rubbers. All water from this slurry constitutes waste water and must be disposed of. While the waste water contains sodium salts from the neutralization, reworking and recycling the waste water to remove the sodium salts is not economically viable because the salt concentration is too low.

The rubber crumbs are separated from the bulk water mechanically using simple sieve trays or screens. The (halo) butyl rubber still contains approximately 30 to 50% water after this first separation. Further mechanical drying is then conducted using extruders by kneading the product and squeezing out the water. The disadvantage of this mechanical drying process is the contamination of water by small rubber particles that were not held back by the sieves with the result that the waste water requires additional treatment.

The aforementioned mechanical dewatering can only diminish moisture content down to approximately 5 to 15%. Additional thermal drying stages are then required. The rubber is thereby heated to 150 to 200° C. under pressure in a single screw or twin screw extruder. A die plate is installed to maintain the pressure. When the rubber is pushed through the die plate, the water in the rubber evaporates and forms open porous crumbs. A cutting device then cuts the crumbs into small pieces. The crumbs are conveyed to a convective dryer where residual moisture is removed by hot air. After such drying, the (halo)butyl rubber generally has a moisture content of 0.1 to 0.7%. A cooling stage, accomplished by flowing cold air through the rubber crumbs, is then needed to cool the butyl rubber crumbs down to the maximum baling temperature of 60° C. The crumbs are then formed into bales by hydraulic presses, and the bales are packed into boxes or crates for shipment.

The aforementioned processes for drying (halo)butyl rubbers is complex and requires extensive equipment. Furthermore, the process parameters must be carefully monitored to avoid heat and shear stress, which would accelerate degradation of the (halo)butyl rubber.

Various other special processes have been developed with the aim of removing water and volatile organic solvents from polymers. Extruder degassing in vacuum with or without the use of entrainers has gained acceptance in practical applications as the most important technique, however, the energy requirements of such prior art processes are quite high.

U.S. Pat. No. 3,117,953 A1 discloses an apparatus and process for purifying high pressure polyethylene. The substitution of synthetic rubber cement for polyethylene in U.S. Pat. No. 3,117,953 A1 would, however, result in crumbs being formed prior to entering the extruder, which is not desirable at all.

DE 195 37 113 discloses a method and an apparatus for polymer resins in particular polycarbonate resins using a steam stripper a decanter and an extruder. However, the introduction of steam would result in an undesirable high content of residual water or a very high energy consumption.

U.S. Pat. No. 4,055,001 discloses a method for the preparation of polymers such as butyl rubber having a water content of less than 0.1 wt.-% by using ultrasound sonotrodes during the drying process. However, the very high shear stress associated with the use of ultrasound is prohibitive for polymers such as halobutyl rubbers.

EP 0 102 122 discloses a method for polymer recovery from a solution, in particular for recovery of polyethylene, using a partially filled extruder. However, EP 0 102 122 is silent about the removal of residual water.

US 2001/056176 A1 discloses a one step method of recovering a polymer and specifically an example for the concentration of rubber solutions. The rubber solution is thereby heated with steam in order to remove existing solvents in one step by degassing under vacuum to produce white crumb. US 2001056176 A1 thereby requires a large volumetric vapor flow to remove the volatile components at low vapor pressure and results in the enclosure of additional water in the crumbs, which water would subsequently need to be removed.

U.S. Pat. No. 5,283,021 A1 discloses a two step process for removing solvent from an elastomeric polymer solution. The polymer solution is thereby heated directly by a heating fluid and sprayed under vacuum. During the spraying, the solvent is evaporated, thereby forming crumbs which are then fed to an extruder for further degassing. However, crumb formation at that stage is not desirable.

EP 1 127 609 A2 discloses a process to treat a product in at least one kneader. EP 1 127 609 A2 uses energy introduced in part through the wall of the kneader itself to evaporate the solvent from solutions containing elastomers and thermoplastics. A kneader with a large surface area is therefore required as are high investment costs. Another portion of the energy is introduced via the rotating shaft of the kneader as mechanical energy. Mechanical energy is more expensive and therefore environmentally disadvantageous when compared to steam heating. The kneaders used in EP 1 127 609 A2 require a great deal of maintenance and cleaning. The introduction of mechanical energy via the kneader is furthermore strongly dependent on the viscosity of the product, which reduces the flexibility of the process.

EP 1 165 302 A1 discloses a device and method for degassing plastics. The apparatus in EP 1 165 302 A1 is an extruder with a rear vent and several vent sections operated under vacuum. The vacuum is needed to achieve low residual volatile concentrations, EP 1 165 302 A1 discloses that a stripping agent can be applied to further improve degassing efficiency. The plastic used in EP 1 165 302 A1, the thermoplastic polycarbonate, remains a flowing melt at the end of the degassing process. A synthetic rubber cement processed pursuant to EP 1 165 302 A1 would, however, convert to crumbs at the end of the degassing stage and could not be processed further.

PCT/EP2009/062073 discloses a device and method for degassing non-volatile polymers. The device preferably comprises a twin screw extruder with a rear vent and several forward directed vent sections. However, this type of extruder is limited with respect to its mode of operation.

In "Process Machinery", Parts I and II, March and April 2000; Author: C. G., Hagberg, a direct volatilization of rubber solutions using a flash tank and an extruder is disclosed. However, this reference is silent about the contents of volatile compounds in the final product.

In view of the foregoing, an object of the present invention was therefore to provide a continuous, energy efficient, ecologically and economically favourable process to remove volatile compounds from a fluid containing at least one polymer, preferably at least one synthetic rubber, producing a polymer product that is substantially free of volatile compounds.

This object is solved by a process of removing volatile compounds from a concentrated fluid containing at least one non-volatile polymer and at least one volatile compound which comprises at least the step of:

a) feeding a concentrated fluid into at least one drying unit, the drying unit comprising in flow direction at least
  I) a first drying section and
  II) a main extruder section comprising at least an
    extruder degassing section comprising at least a conveying section and a vent port with one or more vapor lines,
    an accumulating section and an outlet section,
    whereby volatile compounds are removed through the vent ports and vapor lines; whereby
    the first drying section is either a kneader or a first extruder and the main extruder section is a main extruder or
    the drying section and the main extruder section are both part of a main extruder, whereby the drying section is upstream the main extruder section and has a smaller cross section than the main extruder section and
    the product obtained at the outlet section of the main extruder is substantially free of volatile compounds.

It is pointed out that the scope of the invention also encompasses any desired combinations of the ranges and areas of preference specified for each feature.

In a preferred embodiment of the invention, the concentrated fluid (L) entering the drying unit is free-flowing. In the context of this invention, the term "free-flowing" means a viscosity in the range of 100 to 50,000,000 mPa*s, preferably 5,000 to 30,000,000 mPa*s and most preferably 10,000 mPa*s to 3,000,000 mPa*s.

As far as not mentioned otherwise the viscosity values of fluids refer to the zero shear viscosity extrapolated from measurements at given temperature using a Haake Rheostress RS 150 viscosimeter or a rotational rheometer of cone-plate type for very viscous samples. The extrapolation is performed by taking a $2^{nd}$ order polynomial to reflect the shear stress vs shear rate graph obtained from the measurements. The linear portion of the polynomial reflects the slope at a shear rate of zero and thus is the zero shear viscosity.

In the context of this invention, the term "substantially free of volatile compounds" means a total concentration of volatile compounds of less than 1 wt %, preferably less than 0.5 wt % based on the mass of the non-volatile polymer.

In particular, the term "substantially free of volatile compounds" means substantially free of water and substantially free of volatile organic compounds.

Non-volatile polymers are considered to be substantially free of water, if the residual water concentration is less than 0.5 wt % preferably less than 0.25 wt %, more preferably less than 0.1 wt % and most preferably less than 0.075 wt % based on the mass of the polymer.

In the context of this invention, the term "volatile organic compounds" means organic compounds having a boiling point of below 250° C. at standard pressure.

Non-volatile polymers are considered substantially free of volatile organic compound, if the residual concentration of said volatile organic compounds is less than 0.75 wt % preferably less than 0.25 wt % and most preferably less than 0.1 wt % based on the mass of the polymer. Said volatile organic compounds are typically the solvents employed in the polymerization or subsequent processing steps like a halogenation step and include hydrocarbons like hexanes and pentanes.

Preferred non-volatile polymers are synthetic rubber products.

In the context of this invention, the term synthetic rubber products includes butyl rubbers and halogenated butyl rubbers, polyisobutylene, ethylene propylene diene M-class rubbers (EPDM), nitrile butadiene robbers (NBR) and styrene-butadiene rubbers (SBR).

As used herein, the term halogenated rubber includes bronco- and chlorobutyl rubbers, brominated and/or chlorinated terpolymers such as those described in U.S. Pat. No. 6,960,632 and Kaszas et al., Rubber Chemistry and Technology, 2001, 75, 155 where para-methylstyrene is added to the mixed feed of butyl polymerizations (Methyl chloride, isobutylene and isoprene mixed feed, with aluminum trichloride water mixtures as initiator) resulting in a high molecular weight polymer with up to 10 mol % of styrenic groups randomly incorporated along the polymer chain. The incorporation of para-methylstyrene is found to be uniform throughout the molecular weight distribution due to the similarity in reactivity with isobutylene. The isoprene moieties within the butyl terpolymers can be brominated by conventional methods. Alternatively, a brominated and/or chlorinated terpolymer may comprise a $C_4$ to $C_7$ isomonoolefin, such as isobutylene, and a comonomer, such as para-alkylstyrene, preferably para-methylstrene. The aforementioned copolymers are commercially available under the tradename EXXPRO 3035, 3433, 3745. When halogenated, some of the alkyl substituent groups present in the styrene monomer units contain a benzylic halide formed from halogenation of the polymer.

Preferred synthetic rubber products are butyl rubbers and halogenated butyl rubbers, in particular bromobutyl rubbers.

In the context of this invention butyl rubber denotes a (co)-polymer of isobutene (2-methylpropene) and isoprene (2-methylbuta-1,3-diene). On a molar basis, the isoprene content in the polymer is between 0.001% and 5, preferably between 1.4 and 2.3 mol %. Butyl rubber is composed of linear polyisobutene chains with randomly distributed isoprene units. The isoprene units introduce unsaturated sites into the polymer chain to enable vulcanization. The mass average molecular weight of butyl rubber molecules Mw is typically between 50,000 and 1,000,000 g/mol, preferably between 300,000 and 1,000,000 g/mol.

The halogenated butyl rubbers also contain a certain amount of halogen chemically bound to the rubber molecules. The amount of chemically bound halogen is typically in the range of more than 0 to 3 wt % with respect to total mass of the polymer. The (halo)butyl rubbers may also contain additives, e.g. 0.0001 to 4 phr (phr=parts per hundred rubber with respect to rubber weight), epoxidized soy bean oil (ESBO), 0.001 to 5 phr calcium-stearate and 0.0001 to 0.5 phr antioxidants. Other additives are also applicable, dependent on the application of the butyl rubber product, i.e. fillers or colorants.

In case of bromobutyl rubber, the typical bromine content in the finished product is 1.5 to 2.5 wt %, preferably 1.6 to 2.0 wt %.

In case of chlorobutyl rubber, the typical chlorine content in the finished product is 1.0 to 1.5 wt %, preferably 1.15 to 1.35 wt %.

The subject of the invention will be described in more detail by means of schematic drawings in which:

FIG. 1 shows a drying unit comprising a first extruder comprising three extruder degassing sections and three accumulating sections, whereby one extruder degassing section is a backward degassing section and a main extruder comprising three extruder degassing sections, three accumulating sections and one outlet section, whereby one extruder degassing section is a backward degassing section and whereby the first extruder and the second extruder are connected in series by a simple tubing comprising a throttle.

FIG. 2 shows a drying unit comprising a kneader comprising a plurality of kneader elements on two shafts and a conveying screw and a main extruder comprising three extruder degassing sections, three accumulating sections and one outlet section, whereby one extruder degassing section is a backward degassing section and whereby the conveying screw of the kneader and the second extruder are connected in series by a simple tubing comprising a throttle.

FIG. 3 shows a drying unit comprising a first extruder comprising three extruder degassing sections and three accumulating sections, whereby one extruder degassing section is a backward degassing section and a main extruder comprising three extruder degassing sections, three accumulating sections and one outlet section, whereby one extruder degassing section is a backward degassing section and whereby the first extruder and the second extruder are connected in series by a tubing comprising a gear pump.

FIG. 4 shows a drying unit comprising a first extruder comprising three extruder degassing sections and three accumulating sections, whereby one extruder degassing section is a backward degassing section and a main extruder comprising three extruder degassing sections, three accumulating sections and one outlet section, whereby one extruder degassing section is a backward degassing section and the first extruder and the second extruder are connected in series by a tubing comprising a gear pump and the outlet section comprising a gear pump and means for the processing of the product under water.

FIG. 5 shows a drying unit comprising a main extruder comprising a first drying section comprising three extruder degassing sections and three accumulating sections, whereby one extruder degassing section is a backward degassing section and a main extruder section comprising two extruder degassing sections, two accumulating sections and an outlet section, whereby the extruder degassing sections of the first drying section have a smaller cross section than the extruder degassing sections of the main extruder section.

FIG. 6 shows a single-stage concentrator unit comprising a pressure regulation device, a reheating unit and a drying unit comprising a first extruder comprising four extruder degassing sections and four accumulating sections, whereby one extruder degassing section is a backward degassing section and a main extruder comprising four extruder degassing sections, four accumulating sections and one outlet section, whereby one extruder degassing section is a backward degassing section and whereby the first extruder and the second extruder are connected in series by a simple tubing comprising a gear pump.

FIG. 7 shows a single-stage prewashing unit comprising a coalescer, a single-stage concentrator unit, a reheating unit and a drying unit comprising a first extruder comprising four extruder degassing sections and four accumulating sections, whereby one extruder degassing section is a backward degassing section and a main extruder comprising four extruder degassing sections, four accumulating sections and one outlet section, whereby one extruder degassing section is a backward degassing section and whereby the first extruder and the second extruder are connected in series by a simple tubing comprising a throttle.

FIG. 10 shows a double-stage prewashing unit having additional heaters

Figure 1:
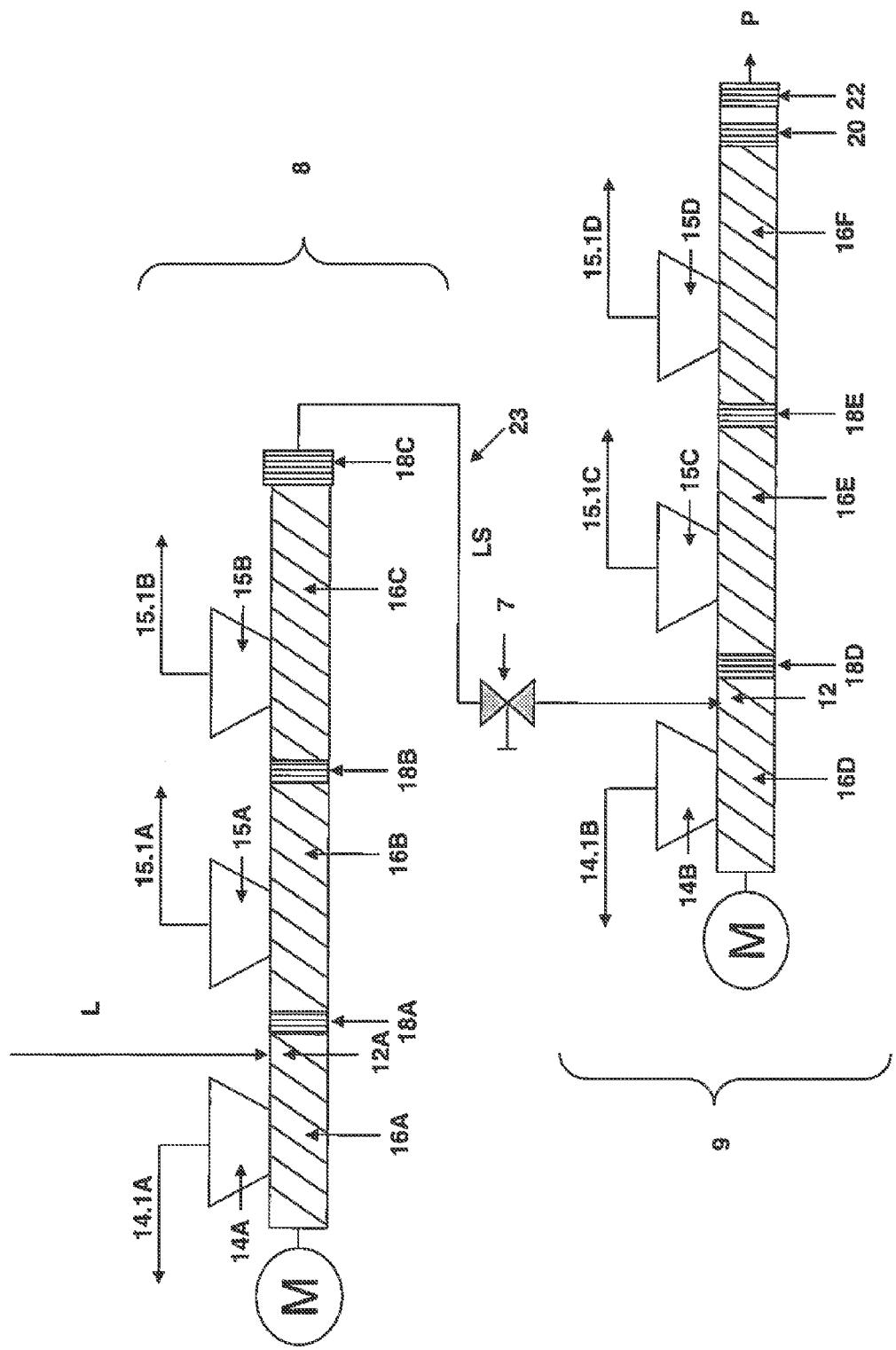

A basic and exemplary embodiment of the process step is shown in FIG. 1. In step a) a concentrated Fluid L containing at least one non-volatile polymer and at least one volatile compound is fed into as drying unit comprising in flow direction a drying device (8), which is a first extruder, and a main extruder (9) whereby in the first extruder the concentrated Fluid L is first converted to a superconcentrated fluid LS by removal of volatile compounds through the vent ports and vapor lines of the first extruder and then further converted to a product (P) which is substantially free of volatile compounds by further removal of volatile compounds through the vent ports and vapor lines of the main extruder.

The concentrated fluid (L) is fed into the first extruder at the feeding point 12A at the conveying section 16A of the first extruder degassing section of the first extruder.

In one embodiment the temperature of the concentrated fluid L fed into the drying unit is for example in the range of from 50° C. to 200° C., preferably in the range of 100° C. to 170° C.

The concentrated fluid L for example comprises from 10 to 80, preferably from 25 to 70 wt % and more preferably from 40 to 65 wt.-% of a non-volatile polymer, preferably a synthetic rubber and more preferably (halo)butyl rubber and from about 20 to 90, preferably from 30 to 75 wt % and more preferably from 35 to 60 wt.-% of volatile compounds whereby the aforementioned components non-volatile polymer, volatile compounds add up to 90 to 100 wt %, preferably to 95 to 100 wt % of the total mass of fluid L.

In a preferred embodiment and where the feedstock fluid L comprises water, fluid L for example comprises from 10 to 80, preferably from 25 to 70 wt % and more preferably from 40 to 65 wt.-% of a non-volatile polymer, preferably a synthetic rubber and more preferably (halo)butyl rubber, from 5 to 89.5, preferably from 15 to 74.5 wt % and more preferably from 45 to 34.5 wt.-% volatile organic compounds, in particular a solvent, and 0.5 to 15 wt.-% water, whereby the aforementioned components non-volatile polymer, volatile organic compound and water add up to 90 to 100 wt.-%, preferably 95 to 100 wt.-% of the total mass of fluid L.

The concentrated fluid L, while passing through the first drying section 8, in FIG. 1 a first extruder, undergoes a transition to a superconcentrated fluid LS which is then fed into the main extruder section which is a main extruder in FIG. 1.

The superconcentrated fluid (LS) is fed into the main extruder 9 at the feeding point 12B at the conveying section 16D of the first extruder degassing section of the main extruder.

In one embodiment the temperature of the superconcentrated fluid LS fed into the main extruder is for example in the range of from 50° C. to 200° C., preferably in the range of 80° C. to 180° C.

The superconcentrated fluid (LS) comprises less volatile compounds than the concentrated fluid L. The superconcentrated fluid (LS) for example comprises from 50 to 98, preferably from 60 to 95 wt % and more preferably from 70 to 95 wt.-% of a non-volatile polymer, preferably a synthetic rubber and more preferably (halo)butyl rubber and from about 2 to 50, preferably from 5 to 40 wt % and more preferably from 5 to 30 wt.-% of volatile compounds whereby the aforementioned components non-volatile polymer, volatile compounds add up to 95 to 100 wt %, preferably to 97 to 100 wt % of the total mass of superconcentrated fluid LS.

In a preferred embodiment the superconcentrated fluid LS is preferably free-flowing, as defined above.

In a preferred embodiment and where the feedstock fluid L comprises water, superconcentrated fluid LS for example comprises from 50 to 98, preferably from 60 to 95 wt % and more preferably from 70 to 95 wt.-% of a non-volatile polymer, preferably a synthetic rubber and more preferably (halo)butyl rubber, from 1.0 to 49.9, preferably from 1.0 to 39.9 wt % and more preferably from 1.0 to 29.5 wt.-% volatile organic compounds, in particular a solvent, and 0.1 to 10 wt.-%, preferably 0.1 to 5 wt.-% water, whereby the aforementioned components non-volatile polymer, volatile organic compound and water add up to 90 to 100 wt.-%, preferably 95 to 100 wt.-% of the total mass of superconcentrated fluid LS.

In a typical and exemplary procedure from 10 to 90 wt.-% of the total volatiles removed in the drying unit are removed in the first drying section, preferably from 40 to 80 wt.-% and more preferably from more than 50 to 80 wt.-%.

In one embodiment the pressure of the concentrated fluid L fed into the main extruder is for example in the range of from 100 kPa to 2 MPa, preferably in the range of from 500 kPa to 2 MPa.

The pressures and temperatures of the fluids L and LS are typically selected such that upon entering the first drying section or the main extruder a significant pressure drop occurs which flashes out significant portions of the volatile compounds, Associated therewith is a significant temperature drop due to the evaporation of volatile compounds. Typically the temperature profile within the first and main extruder is such that the temperature is rising from one conveying section to the next.

Suitable extruder types for the main extruder include single screw and multiscrew extruders comprising any number of barrels and types of screw elements and other single or multishaft kneaders. Possible embodiments of multiscrew extruders are twin-screw extruders, ring extenders or planetary roller extruders, whereby twin-screw extruders and ring extruders are preferred.

Single screw extruders include those having an axial oscillating screw. Twin screw extruders are for example counter-rotating intermeshing, counter-rotating non-intermeshing, co-rotating intermeshing and co-rotating non-intermeshing twin screw extruders, whereby co-rotating intermeshing twin screw extruders are preferred.

In one embodiment of the invention the extruders can either be heated via the barrels to temperatures up to 300° C. or cooled.

In a preferred embodiment, the extruder comprises means to operate separate zones independently of each other at different temperatures so that the zones can either be heated, unheated or cooled.

In another preferred embodiment the extruder comprises for each conveying section at least one separate zone, which can be operated independently at different temperatures.

Preferred extruder materials should be non-corrosive and should substantially prevent the reheated concentrated fluid L and the Product P from being contaminated with metal or metal ions. Preferred extruder materials include nitrided steel, duplex steel, stainless steel, nickel-based alloys, composite materials like sintered metals, hot isostatic pressed materials, hard wear resistant materials like Stellite, coated metals with coatings for example made from ceramics, titanium nitride, chromium nitride and diamond like carbon (DLC).

The aforementioned extruder types including the heating or cooling means optionally located in several distinct zones and the materials mentioned for the main extruder are also suitable for extruders of a first drying section, whereby any possible combinations of extruders can be used.

However, in a preferred embodiment the main extruder typically has a larger cross sectional area than the first extruder, preferably the ratio of the cross sectional area of the main extruder A(main) to the cross sectional area of the first extruder A(first) is in the range of A(main)/A(first) from 1.01 to 5.00, preferably from 1.1 to 3.0 and more preferably from 1.3 to 2.5.

The conveying sections 16B, 16C, 16E and 16F are each open to a vent port (15A to 15D). The upstream conveying sections 16A and 16B are open to vent ports 14A and 14B. In the conveying sections 16A to 16F a part of the solvent is evaporated and separated from the reheated concentrated fluid L. The vapors are removed through the vent ports 14A and 14B and 15A to 15D via vapor lines 14.1A, 14.1B and 15.1A to 15.1D.

Since the evaporated volatile compounds have a tendency to entrain the reheated concentrated fluid L or the product. P towards the vent ports, in a preferred embodiment of the invention the vent ports 15 are designed to prevent the material, in particular the reheated concentrated fluid L or the Product P, from coming out of the vent ports.

Suitable means to accomplish that purpose are stuffer screws, that are mounted on the vent ports and convey any material back into the extruder, or rollers or belts, that are applied to the inside of the vent ports to push deposited material back into the extruder. Stuffer screws are preferred. The stuffer screws may comprise one, two or more shafts, whereby stuffer screws comprising one or two shafts are preferred.

As an alternative or preferably in addition to the aforementioned, coatings of the vent ports may be applied which reduce or prevent sticking of the material to the surface. Suitable coatings include Ethylene-Tetrafluorethylene (ETFE), Polytetrafluoroethylene (PTFE) and Nickel-Alloys.

The pressure at the vent ports 14A, 15A and 15B of the first extruder is for example between 1 hPa and 2.000 hPa, preferably between 5 hPa and 1500 hPa.

The pressure at the vent ports 14B, 15C and 15D of the main extruder is for example between hPa and 2,000 hPa, preferably between 5 hPa and 1000 hPa.

In a preferred embodiment, the pressure at the vent ports 14B, 15C and 15D of the main extruder is lower than at the vent ports 14A, 15A and 15D of the first extruder.

The vapor lines may be and are preferably connected to a condensing system.

In general, the purpose of the condensing system is to collect volatile compounds removed by the vent ports via the vapour lines and typically comprises a condenser and a vacuum pump. Any condensing system known in the art may be used to effect the recovery of volatile compounds.

Generally, it is preferred to recycle the condensed volatile compounds, optionally after carrying out a phase separation to separate the volatile organic compounds from water, into a process for the preparation of fluid L.

The conveying sections are terminated by accumulating sections 18A to 18E and 20. The purpose of the accumulation is to assure a certain pressure level in the vent ports and to introduce mechanical energy into the material to facilitate evaporation of volatile compounds. The accumulating sections may comprise any means that enable the accumulation of the material. It may be designed to include for example kneading or throttling elements, blister discs or die plates.

Examples of throttling elements are conical or cylindrical flow paths or other throttling means.

The application of kneading elements, blister discs or die plates within the accumulating section is preferred, kneading elements are even more preferred. Examples of kneading elements include kneading blocks, which may be designed as double or triple flighted forward, backward or neutral conveying kneading blocks; single or double flighted screw mixing elements with grooves, single flighted tooth mixing elements, blister plates and single, double or triple flighted eccentric discs. The kneading elements may be assembled in any combination on the screw shafts of the extruder, in particular of a twin screw counter rotating or co-rotating twin screw extruder.

A typical accumulating section comprises of 2 to 10 kneading blocks, oftentimes terminated by a back conveying type of kneading element. For mixing in of a stripping agent, tooth type elements or screw elements with grooves may be applied.

Eccentric discs are preferably applied in the last section of the extruder, where the product P is highly viscous and substantially free of volatile compounds.

For planetary roller extruders, kneading elements like tooth shaped rollers are or rollers with grooves and clearances are preferred.

Generally the main extruder and as far as the first drying unit is a first extruder also the first extruder may comprise one or more conveying sections and one or more accumulating sections, whereby the number is only limited by constructional constraints. A typical number of conveying sections and accumulating sections is 1 to 30, preferably 2 to 20 and more preferably 3 to 15.

In a preferred embodiment or the invention the reheated concentrated fluid L or the superconcentrated fluid LS is injected into the first extruder degassing section of the first extruder and the main extruder respectively, whereby the first extruder degassing section comprises one or more rear vent ports in upstream direction each connected to a vapor line.

The advantage of rear vent ports is that the volatile compounds present in the concentrated fluid L and the superconcentrated fluid LS undergo sudden and rapid evaporation, thereby effecting at least partial separation of the polymer and the volatile compounds, the vapors emerging through the rear vents in upstream direction. Generally, from about 50 to about 99 wt %, of the volatile compounds present in the fluids L and LS are removed through the upstream vents.

The last accumulating section 20 is typically designed to form a product plug at the outlet of the extruder, thereby preventing surrounding air from entering the extruder. While passing from the conveying sections and the accumulating section to the outlet section 22 the concentrated fluid L undergoes a transition from the preferably free-flowing concentrated fluid L to a superconcentrated fluid LS in the first extruder and further to the product P in the main extruder, whereby the product P typically has a crumbly or plastic-like appearance.

The outlet section 22 typically comprises means to allow the product to exit the main extruder and optionally but preferably product processing equipment. Examples of suitable product processing equipment includes combinations of die plates and cutters; die plates and underwater-pelletizing means; means for crumb formation like screw elements with teeth and holes; turbulators which may be designed as cylinders with holes in it, whereby the product is pressed from the outside to the inside of the cylinder, and whereby a rotating knife inside the cylinder cuts the product into pieces; fixed knifes placed at the end plate of the extruder, whereby the screw rotation causes the cutting action, which preferably is applied when working with twin screw co-rotating, single screw and planetary roller extruders.

To reduce the mechanical and thermal stress to the product, in a preferred embodiment of the invention the product processing equipment is combined with cooling means.

The cooling means comprises any means that allow the removal of heat from the product. Examples of cooling means include pneumatic crumb conveyers with convective air cooling vibrating crumb conveyers with convective air cooling, vibrating crumb conveyer with cooled contact surfaces, belt conveyer with convective air cooling, belt conveyer with cooled belts, water spraying on hot crumbs upon outlet of the extruder and as already mentioned underwater-pelletizing means, whereby water serves as the coolant.

The product P may then be processed further for final packing and shipping, (Halo)butyl rubber for example is cooled to a temperature of or below 60° C. formed into bales e.g. by a hydraulic press, and then packed into boxes or crates for shipment.

In general, an increasing feed rate of the concentrated fluid L at the feeding point. 12A or an increasing feed rate of the superconcentrated fluid LS at the feeding point 12B requires a corresponding increase in the screw speed of the first extruder. Moreover, the screw speed determines the residence time of fluid L. Thus, the screw speed, feed rate and the extruder diameter are typically interdependent. Typically the first extruder is operated in such a manner that the dimensionless throughput $V/(n*d^3)$, wherein V denotes the Volume flow rate at the outlet of the respective extruder or stage, n the screw speed expressed in revolutions per minute and d the effective diameter of the extruder is adjusted to about 0.01 to about 0.2 preferably to about 0.015 to about 0.1.

Typically the main extruder is operated in such a manner that the dimensionless throughput $V/(n*d^3)$ is adjusted to about 0.01 to about 0.7 preferably to about 0.015 to about 0.5.

The maximum and minimum feed rates and extruder screw speeds are determined by for example the size of the extruder, the physical properties of the synthetic rubber product contained in fluids L and LS and the target values of remaining volatile compounds. Given these properties, however, the operating parameters can be determined by one skilled in the art by some initial experiments.

In one embodiment of the invention the drying unit is operated at a feed rate of 5 to 25,000, preferably of 5 to 6,000 kilograms per hour.

The scope of the invention also encompasses embodiments wherein the superconcentrated fluid LS leaving first drying section is fed into two or more main extruder sections or wherein the superconcentrated fluid LS leaving two or more first drying sections is fed into one main extruder section or any other embodiment wherein the number of first drying sections is different from the number of main extruder sections.

Generally, the degassing in the extruders may be aided by the addition of a stripping agent that is removed together with other volatile compounds. Even though the stripping agent may be added anywhere in the extruder unit, the addition in one or more accumulating sections is preferred. In a more preferred embodiment a stripping agent is added in one or more accumulating sections except the last one 20.

Suitable stripping agents are substances that are inert to the concentrated fluid L, the superconcentrated fluid LS and/or the product P and have a vapor pressure greater than 100 hPa at 100° C.

In the context of the invention, the term "inert" means that the stripping agent does not or virtually not react with the polymers contained in the reheated concentrated fluid L, the superconcentrated fluid LS and/or the product P. Suitable stripping agents are nitrogen, carbon dioxide, noble gases, propane, butane, water or a mixture of the aforementioned substances, whereby carbon dioxide is preferred. The amount of stripping agent may be 0.0001 to 10, preferably 0.001 to 5 and more preferably 0.1 to 2 wt.-% based on the amount of the polymer product obtained at the outlet section.

The first drying section and the main extruder section need to be connected if they represent different devices. Suitable means for connection are tubings, lines, pumps or conveyor screws or directly connected barrel sections of the extruder, whereby tubings and lines are preferably equipped with pressure regulation devices such as pressure retention valves or other means fulfilling the purpose of keeping the pressure in a desired range.

Figure 3:
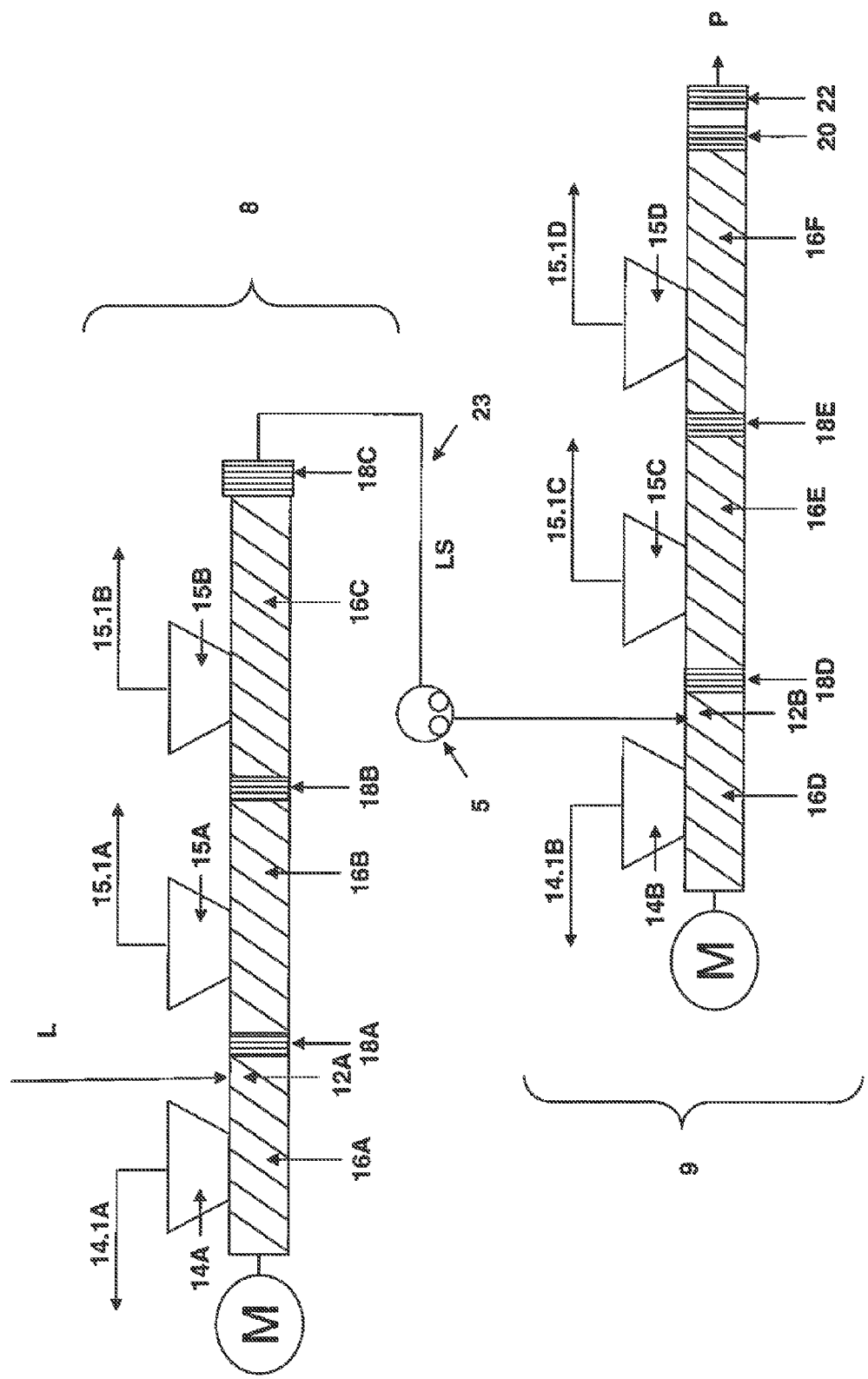

FIG. 3 shows the same drying unit as FIG. 1 with the only difference being that the tubing 23 is equipped with a gear pump 5 instead of a pressure regulation device 7.

The invention further relates to a device suitable to accomplish the process according to the invention. Therefore the invention also encompasses a device comprising a least one first drying section being a kneader or an extruder
one main extruder comprising at least one feeding point 12, one extruder degassing section 16, one accumulating section 20 and one outlet section 22, whereby the extruder degassing section 16 further comprises at least one vent port 15 connected to a vapour line 15.1.
whereby the first drying section and the main extruder are in communication.

In the context of this invention the term "in communication" includes direct or indirect connections whereby indirect connections may be accomplished for example via tubes or pipes. The term "in communication" further includes the option that between the units or means in communication further units or means are arranged. In particular the connections may comprise pressure regulation devices such as throttles, valves, in particular pressure retention valves and pumps such as gear pumps.

The invention further encompasses the use of the aforementioned device for the production of non-volatile polymers, which are substantially free of volatile compounds.

The invention further encompasses all devices comprising the specific and non-specific embodiments disclosed herein to describe the process as well as a chemical plant comprising the aforementioned devices.

Figure 2:
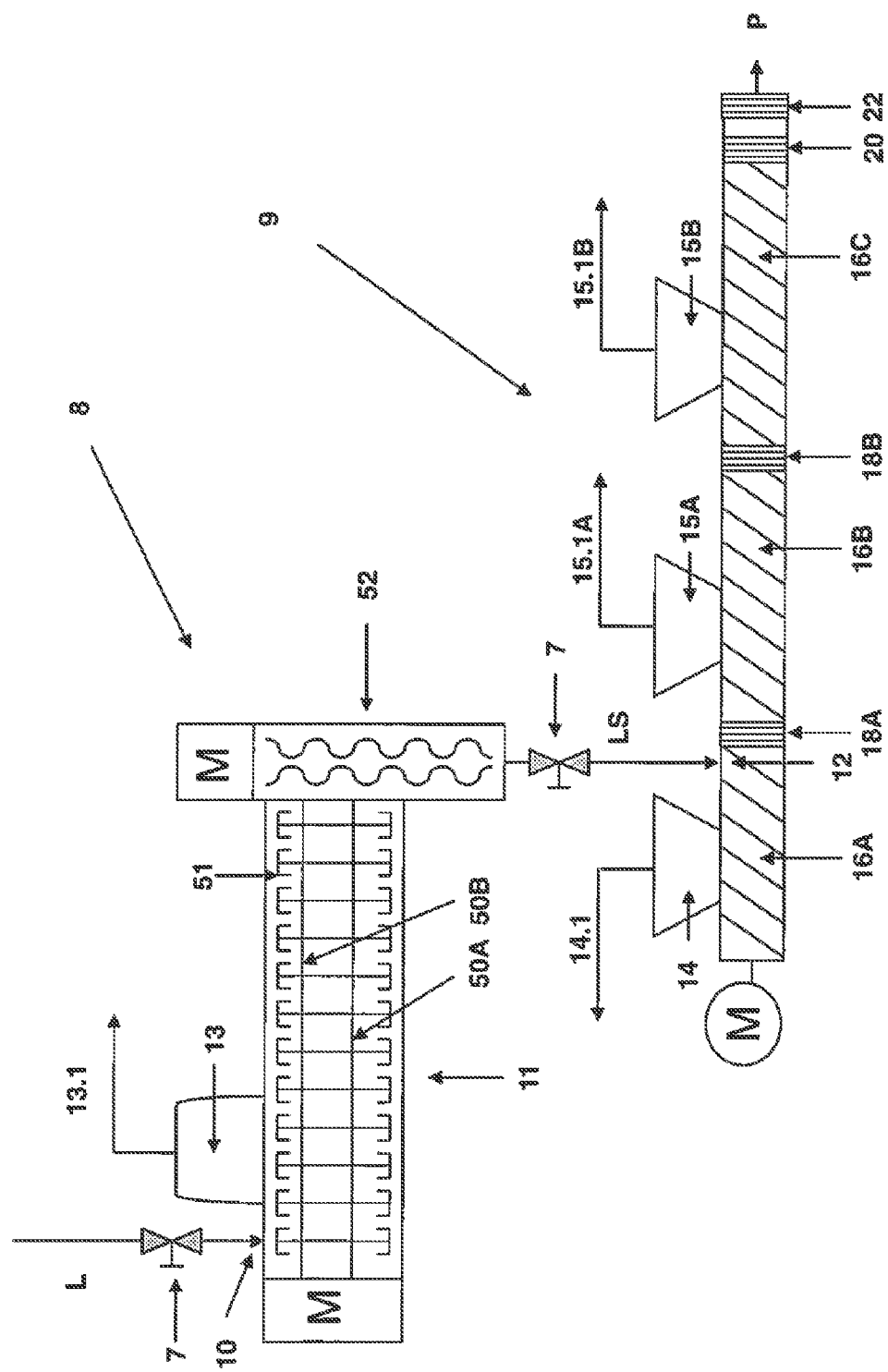

Another embodiment of the invention is shown in FIG. 2. FIG. 2 shows another flow chart and suitable device for the accomplishment of the process according to the invention comprising a kneader as a fist drying section 8 and the same extruder as a main extruder as already illustrated in FIG. 1. The concentrated fluid L is fed into the kneading section at the feeding point 10 of the kneader. The kneading section 11 is open to a vent dome 13. In the kneading section a part of the solvent is evaporated and separated from the concentrated fluid L. The vapors are removed through the vent dome 13 via vapor line 13.1. The kneading section comprises two shafts 50A and 50B each equipped with kneading elements 51. The kneading section in flow-direction is terminated by a conveyor screw 52. While passing from the feeding point 10 to the conveying screw 52, the concentrated fluid L undergoes a transition from the concentrated fluid L to the superconcentrated fluid LS. The conveying screw 52 conveys the superconcentrated fluid LS to the main extruder 9 via a pressure regulation device 7.

Generally any known type of kneader may be used as a first drying section, as far as they are intended or suitable to remove volatile compounds from a concentrated fluid L. The same applies to the kneading elements, suitable kneaders are for example disclosed in EP 1 127 609 A and WO 9404333 A.

However, the use of a first extruder as first drying section is preferred.

Figure 4:
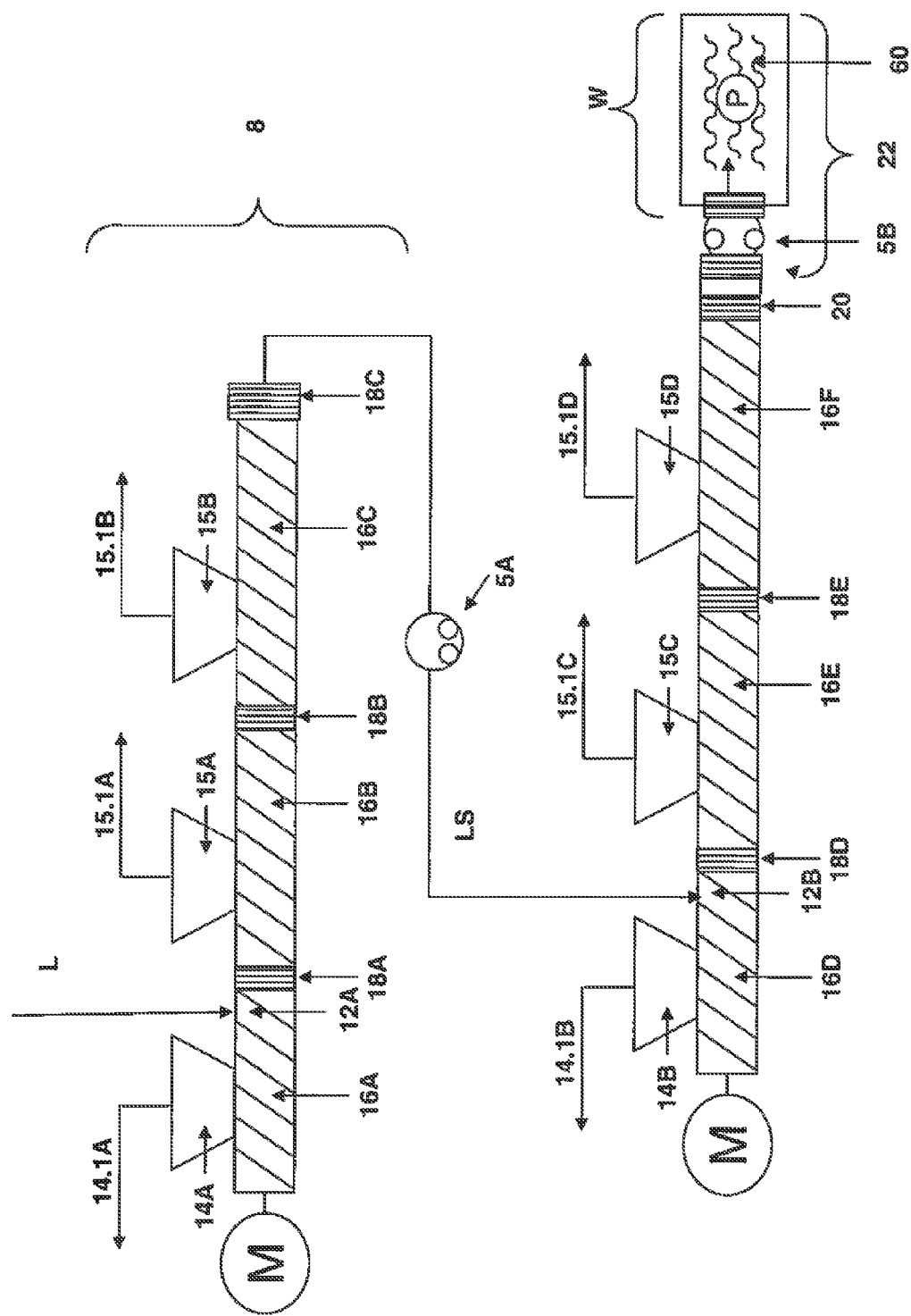

In another embodiment the first drying section is a single-screw or twin-screw extruder and the main extruder is a single-screw or twin-screw extruder FIG. 4 shows the same drying unit as FIG. 1 with the difference being that the tubing 23 is equipped with a gear pump 5A instead of a pressure regulation device 7 and that the outlet section 22 comprises a pump 5B and an underwater processing device W comprising water bassin 60.

To reduce the mechanical and thermal stress to the product this embodiment combines product processing equipment with cooling means.

Typically, suitable underwater processing devices include combinations of a water basin and die plates and cutters, turbulators which may be designed as cylinders with holes in it, whereby the product is pressed from the outside to the inside of the cylinder, and whereby a rotating knife inside the cylinder cuts the product into pieces; fixed knifes placed at the end plate of the extruder whereby the screw rotation causes the cutting action. The cutting is either done directly under water or close to a water surface where the time for the product from being cut to being cooled by water is kept short, preferably below 60 s preferably below 10 s. This type of processing and outlet section is particularly preferable for temperature and/or oxygen sensitive polymers such as halogenated rubbers and in particular bromobutyl rubbers.

In a preferred embodiment of the invention the water temperature is kept in a range of from above 0 to 60° C., preferably from 10 to 50° C.

For polymers that tend to stick together once cut into pieces it is preferred that the water basin 60 is filled with water comprising non-sticky compounds, in particular surface-active compounds. Suitable compounds and means to accomplish this purpose are disclosed in EP 410 914 A which is herein incorporated in its entirety.

Figure 5:
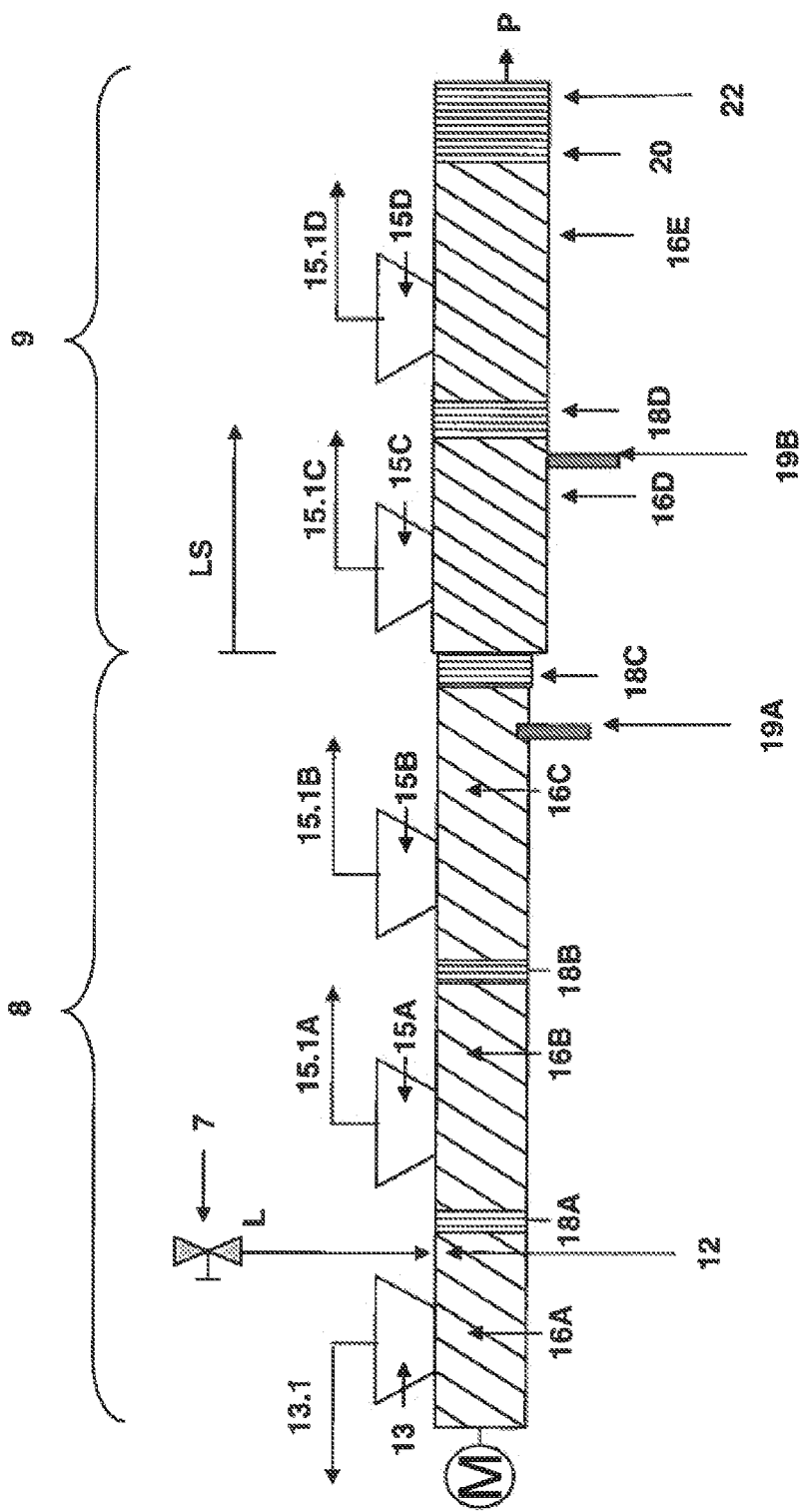

Another embodiment is shown in FIG. 5. FIG. 5 shows a single extruder comprising a first drying section 8 and main extruder section 9, whereby the different sections have different cross sectional areas. The cross sectional area of the first drying section 8, which comprises the conveying sections 16A, 16B and 16C, which are terminated by the accumulating sections 18A, 18B and 18B and which are open to vent ports 13.1, 15.1A and 15.1 B is smaller than the cross sectional area of the main extruder section 9, which comprises the conveying sections 16D and 16E, which are terminated by the accumulating sections 18D and 20 and the outlet section 22.

Typically the ratio of the cross sectional area of the first drying section A(fds) and the cross sectional area of the main extruder section A(mes) is in the range of from A(fds)/A(mes) 0.2 to 0.99, preferably from 0.33 to 0.95 and more preferably from 0.4 to 0.9.

Due to the different cross sectional areas of the conveying sections of the first drying section and the main extruder section the volume reduction due to the discharged volatile compounds can be considered during the extruding process. The conveying sections 16A, 16B and 16C may comprise conveying means specifically adapted to the different crass sectional areas of the conveying sections 16D and 16E. The different conveying means of the different conveying sections may also be operated by different motors. The operating parameters of the conveying means of the different conveying sections can be adjusted with respect to each other for providing and/or controlling a predefined pressure within each conveying section.

In another embodiment the first drying unit may comprise two or more shafts of which only one is part of the main extruder section or vice versa. A typical example thereof are planetary roller or ring extruders which form the first drying section whereby only the main shaft or one shaft is part of the main extruder section or vice versa, Another example is a twin-screw extruder which form the first drying section whereby only one shaft is part of the main extruder section or vice versa.

Generally, the any extruder i.e. either a first extruder the main extruder or both, may comprise one or more side feeders 19, which may positioned anywhere in the extruder, preferably in close proximity to the feeding point or the outlet section 22. Side feeders are suitable for the addition of additives to the polymer. In FIG. 5 one side feeder 19A is located in the first drying section and another side feeder 19B in the main extruder section.

Examples of additives, in particular for (halo)butyl rubber products include stabilizing agents, acid scavengers like ESBO (epoxidized soy bean oil), stearates like calcium stearates, antioxidants and the like. Examples of suitable antioxidants include sterically hindered phenols like butyl-hydroxytoluenes and its derivatives like Inganox 1010 and 1076, amines, mercapto-benzimidazoles, certain phosphites and the like.

In particular, (halo)butyl rubbers ore mixed with additives, e.g. 0.0001 to 4 phr epoxidized soy bean oil (ESBO), 0.0001 to 5 phr calcium-stearate and 0.0001 to 0.5 phr of antioxidants (phr=parts per hundred rubber with respect to rubber weight). Other additives are also applicable, dependent on the application of the butyl rubber product, i.e. fillers or colorants.

As an alternative or in addition to that, additives may also already be added, as far as they are liquid together with the stripping agent.

In a preferred embodiment of the invention the concentration unit, the reheating unit or the extruder unit may independently of each other be equipped with one or more pressure regulation devices which allow the very precise operation of the units under predefined conditions.

The pressure regulation devices may be active or passive, whereby active pressure regulation devices are preferred. Examples of active pressure regulation devices include control valves like a pressure relief valve, examples of passive pressure regulation devices include nozzles and dies or orifice plates. Suitable valves may be selected from ball, piston, gate or needle valves.

In case of a passive pressure control device, it is preferred to calculate an orifice to cause a certain pressure drop. The calculation is based on viscosity of the fluid at that point and the throughput. Anyone skilled in the art can perform this calculation.

Active pressure control devices are typically controlled by a pressure measurement upstream of the device. The pressure is for example measured and compared to the set point. The pressure control device is then adjusted according to the offset recognized.

Alternatively the pressure drop across the device is measured instead of the absolute pressure upstream of the pressure control device. The valve position is adjusted manually, electrically, pneumatically or hydraulically. The control of the valve position, i.e. adjustment to the set point pressure, can for example be made manually or from any automated process control system.

In FIG. 5 a pressure regulation device 7 is located before the feeding point 12 of the drying unit.

Figure 6:
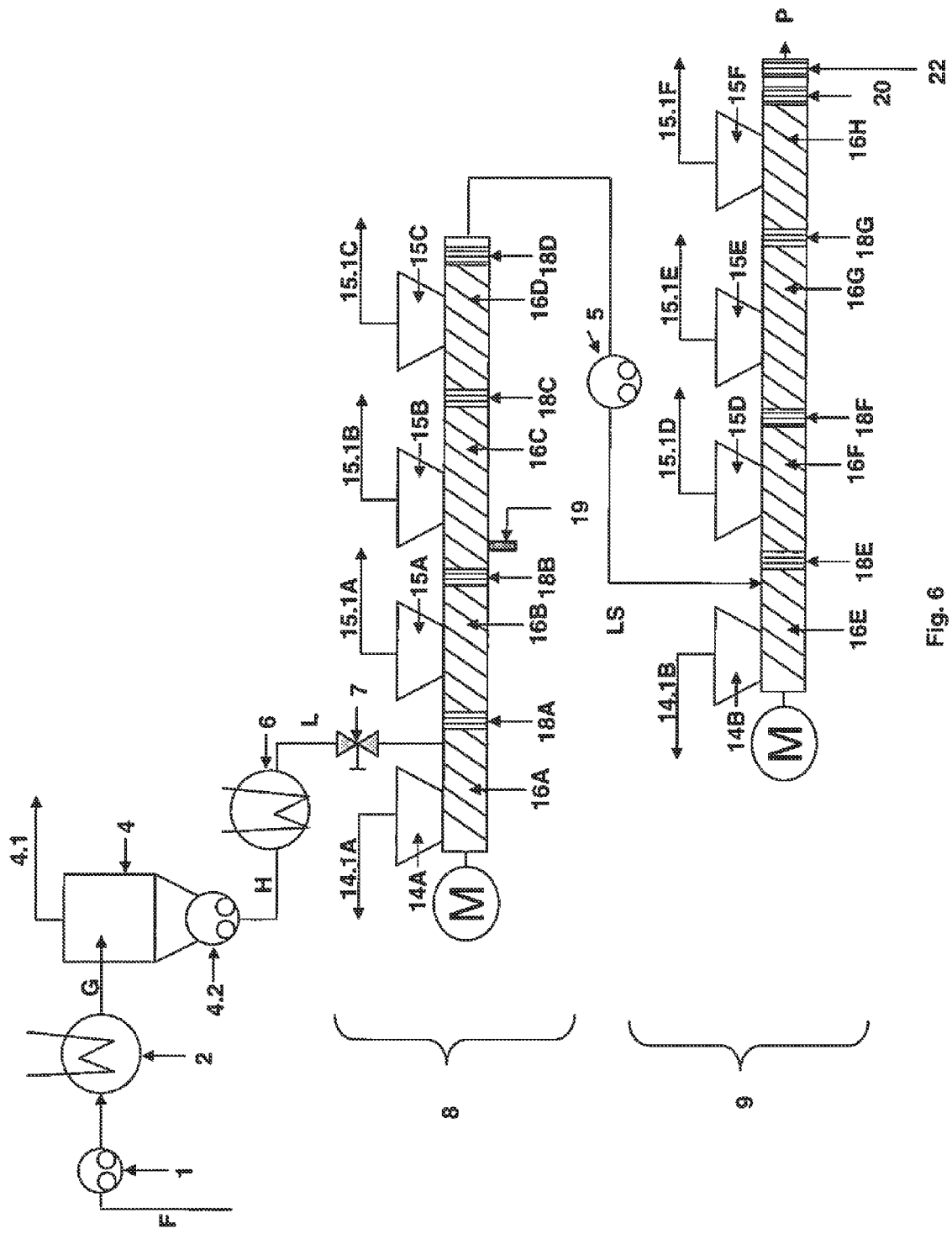

It was found that a significant reduction of volatile compounds or water or both cart be achieved in an advantageous way by preparing the fluid L in a process comprising at least the steps of
A) treating a fluid in at least one concentrator unit comprising at least a heater, a degassing vessel and a vapor line, whereby the fluid is heated, the heated fluid is fed into a degassing vessel where part of the volatile compounds are removed via the vapor line to obtain a concentrated fluid,
B) reheating the concentrated fluid from step A) in at least one reheating unit to obtain a concentrated fluid L;

A basic and exemplary embodiment of the process steps A) and B) is shown in FIG. 6. In step A) Fluid F containing at least one non-volatile polymer and at least one volatile compound is transferred via pump 1 to the heater 2, where the fluid F heated.

Fluid F, also called cement, may contain for example from 3 to 50 wt % of a non-volatile polymer, preferably a synthetic rubber and more preferably a (halo)butyl rubber and from 60 to 97 wt % volatile compounds, in particular a solvent or a solvent and water, whereby the aforementioned components add up to 90 to 100, preferably 95 to 100 wt % of the total mass of fluid F.

The solvent is preferably selected from the group consisting of linear or branched alkanes having between 4 and 10 C atoms, preferably 4 to 7 C atoms. More preferred solvents are n-pentane, iso-pentane, n-hexane, cyclohexane, iso-hexane, methyl-cyclopentane, methyl-cyclohexane and n-heptane as well as mixtures comprising or consisting of those alkanes.

In a preferred embodiment of the invention, fluid F contains from 3 to 40 wt % a non-volatile polymer, preferably a synthetic rubber and more preferably (halo)butyl rubber, from 60 to 95 wt % volatile organic compounds, in particular a solvent, and from 0.5 to 20 wt % water, whereby the aforementioned components add up to 95 to 100 wt % of the total mass of fluid F.

The fluid F is typically obtained from polymerization processes or subsequent processing steps. A subsequent processing step is for example the halogenation of butyl rubber. Fluids F containing water are typically obtained after steam stripping processes following the polymerization.

The fluid F entering the heater typically and preferably has a temperature of 10° C. to 100° C., preferably of 30° C. to 80° C. The viscosity of fluid F is for example in the range of 100 mPa*s to 25,000 mPa*s, preferably in the range of 500 mPa*s to 5,000 mPa*s.

A heater may be any device that is able to raise the temperature of Fluid F. In a preferred embodiment, heater 2 is a heat exchanger. The heating medium is selected from the group consisting of steam, heating oil or his pressurized water. The heat exchanger is for example of shell-and-tube type, where the fluid F is inside the tubes and the heating medium is on the shell side. Special inserts in the tubes may be applied to enhance heat transfer. Another type of heat exchanger may also be used, in which fluid F is on the outside of the heat exchanger tubes. The advantage of the aforementioned types of heat exchangers is the avoidance of maldistribution and easy maintenance as well as good heat transfer. Said heat exchangers are well known and commercially available. In a less preferred embodiment Plate type heat exchangers may also be applied.

Upon heating, heated fluid is obtained. The heated fluid G has a higher temperature than fluid F, preferably a temperature of 100 to 200° C., more preferably 110° C. to 190° C. and even more preferably 120° C. to 175° C. The heated fluid G is then conveyed further into a degassing vessel 4. In the degassing vessel, the volatile compounds at least partially evaporate.

Generally the degassing vessel may be a flash evaporator or another device typically used to remove volatile compounds while simultaneously having short retention times.

The vapors are separated and removed from the heated fluid C by a vacuum line 4.1. The pressure in the degassing vessel 4 is for example in the range of 100 hPa to 4,000 hPa, preferably in the range of 200 hPa and 2,000 hPa and more preferred in the range of 230 to 1,100 kPa.

The vapors removed via the vacuum line 4.1 are preferably condensed and recycled into the process for preparation of fluid F. After degassing and separation a concentrated fluid H is obtained, which is removed from the degassing vessel 4 by means of a pump 4.2.

In a preferred embodiment of the invention the degassing vessel is designed in the shape of a cyclone to further aid separation of vapor from heated fluid G. In another preferred embodiment, of the invention the degassing vessel 4 has a conical or at least torispherical shaped bottom, to allow the vessel being emptied completely or substantially complete.

In another embodiment the inner surface of the degassing vessel can be heated.

The pump 4.2 is preferably directly connected to the outlet of the degassing vessel 4. In general, the connection piece between pump and vessel is preferably as short as possible.

The pump 4.2 may be selected from the group consisting of positive displacement type pumps, gear pumps, piston pumps, membrane pumps, screw type pumps, extruder type pumps like counter-rotating or co-rotating single or twin screw extruders or kneader type pumps. Positive displacement type pumps and gear pumps are preferred, gear pumps are even more preferred.

In another preferred embodiment the pump 4.2 comprises a combination of an extruder or a kneader and a gear pump whereby the gear pump is fed from the extruder or kneader.

The amount of volatile compounds that is removed in this step A) is for example dependent on the temperature of fluid G and the pressure in the degassing vessel 4. In a preferred embodiment of the invention the temperature of fluid G and the pressure in the degassing vessel 4 are chosen so that the concentrated fluid H is preferably free-flowing as defined above and comprises for example from 10 to 60, preferably from 25 to 60 wt % of a non-volatile polymer, preferably a synthetic rubber and more preferably (halo butyl rubber and from about 40 to about 90, preferably from 40 to 75 wt % volatile compounds whereby the aforementioned components non-volatile polymer, volatile organic compound and water add up to 90 to 100 wt %, preferably to 95 to 00 wt % of the total mass of fluid H.

In a preferred embodiment and where the feedstock fluid F comprises water, fluid H for example comprises from 10 to 60, preferably from 25 to 60 wt % of a non-volatile polymer, preferably a synthetic rubber and room preferably (halo)butyl rubber, from about 25 to about 90, preferably from 25 to 75 wt % volatile organic compounds, in particular a solvent, and about 0.5 to about 15 wt % water, whereby the aforementioned components non-volatile polymer, volatile organic compound and water add up to 90 to 100 wt %, preferably 95 to 100 wt % of the total mass of fluid H.

The temperature of the concentrated fluid H is lower than that of heated fluid G and is for example in the range of 15 to 100° C., preferably in the range of 30 to 100° C. The pressure of the heated fluid G is for example in the range of 2 to 60 bar, preferably in the range of 4 to 30 bar. The concentrated fluid H is preferably free-flowing as defined above.

In step B), the concentrated fluid H obtained in step A) is then passed through a reheating unit 6 to obtain a concentrated fluid L. The a preferred embodiment the reheating unit comprises a heat exchanger, whereby the same disclosure including the preferences with regard to heating media and heat exchanger types apply as described above for heat exchanger 2.

The temperature of the reheated concentrated fluid L is typically higher than that of the concentrated fluid L and is for example in the range of 50° C. to 200° C., preferably in the range of 90° C. to 180° C. The pressure of the heated fluid G is for example in the range of 2 to 60 bar, preferably in the range of 4 to 30 bar. The concentrated fluid L is preferably free-flowing as defined above.

The heating stream of the heating unit 6 may be used after heating the concentrated fluid H for heating the fluid F in the heater 2. The heating stream of the reheating unit 6 may be in communication with the heater 2. In addition or in alternate the heating stream leaving the heating unit 6 and/or the heating stream entering the reheating unit 6 may be in communication with a further reheating unit 6 and/or a further heater 2 as. Preferably the heating stream leaving the reheating unit 6 and/or the heating stream entering the reheating unit 6 may be in communication with one or more degassing vessels 4 and/or in communication with one or more drying units. Further it is possible that the heating stream leaving the heater 2 and/or the heating stream entering the heater 2 may be in communication with one or more degassing vessel 4 and/or in communication with one or more drying units. Particularly preferred the heating stream of the heater 2 and/or of the reheater unit 6 are led in counter flow with respect to the heated fluids. Due to a suitable connection of the heating streams of the heater 2, the reheating unit 6 and if so the degassing vessel 2 and/or the drying units a large amount of the heat content of the heating stream can be used. This leads to an increased energy efficiency with respect to the required heat flows at different devices. If necessary, the heating stream may be heated additionally between two different devices for controlling a required temperature of the heating stream. In most cases this additional heating of the heating stream may take place at lower temperatures and at a lower energy level compared to the environment so that the additional heating of the heating stream can be facilitated and enables a better overall efficiency.

Following steps A) and B) in step a), the concentrated fluid L obtained in step B) is passed on to a drying and fed into the conveying section 16A of a first extruder at the feeding point 12A, whereby the first extruder represents the first drying section 8 of the drying unit. The conveying sections 16A, 16B, 16C and 16D are open to vent ports 14A, 15A, 15B and 15C. In the conveying sections a part of the solvent is evaporated and separated from the concentrated fluid L. The vapors are removed through the vent port via vapor lines 14.1, 15.1A, 15.1B and 15.1C. While passing from the conveying section 16A to the accumulating section 18D the concentrated fluid L undergoes a transition from the concentrated fluid L to the superconcentrated fluid LS. The superconcentrated fluid LS, after passing the gear pump 5 and tubing 23, then is fed into the conveying section 16E of the main extruder at the feeding point 12B. The conveying sections 16E, 16F, 16G and 16H are open to vent ports 14B, 15D, 15E and 15F. In the conveying sections a further part of the solvent is evaporated and separated from the superconcentrated fluid LS. The vapors are removed through the vent port via vapor lines 14.1B, 15.1D, 15.1E and 15.1F. While passing from the conveying section 15E to the accumulating section 20 and the outlet section 22 the superconcentrated fluid LS undergoes a transition to the product P, which is substantially free of volatile compounds.

It was further found that a significant reduction of remaining hydrophilic compounds or water or both can be achieved in an advantageous way by preparing the fluids F or L in a process of removing hydrophilic compounds and optionally water from a crude fluid A containing at least one non-volatile polymer, at least one volatile organic compound, one or more hydrophilic compounds and optionally water which comprises at least the step of pre A) treating the crude fluid (A) in at least one pre-washing unit comprising at least a separating apparatus (26), whereby the fluid (A) is mixed with water to obtain an organic phase (28) comprising primarily non-volatile polymer and volatile organic compounds and an aqueous phase (27) comprising primarily water and hydrophilic compounds, and whereby the organic phase (28) is separated from the aqueous phase (27) in a separating apparatus (26) and further used as fluid (F) or directly as concentrated fluid L and whereby at least a part of the aqueous phase (27) is removed from the separating apparatus (fluid C).

In the context of this invention the term "hydrophilic compounds" denotes at least partially water-soluble volatile and non-volatile compounds. Examples include inorganic salts and in particular residues of catalysts employed for the polymerization reaction like e.g. aluminum salts, iron or other transition metal salts or halides resulting from halogenation reactions and neutralizations.

Exemplary embodiments of step pre-A) are illustrated using FIGS. 7, 8, 9 and 10.

Figure 8:
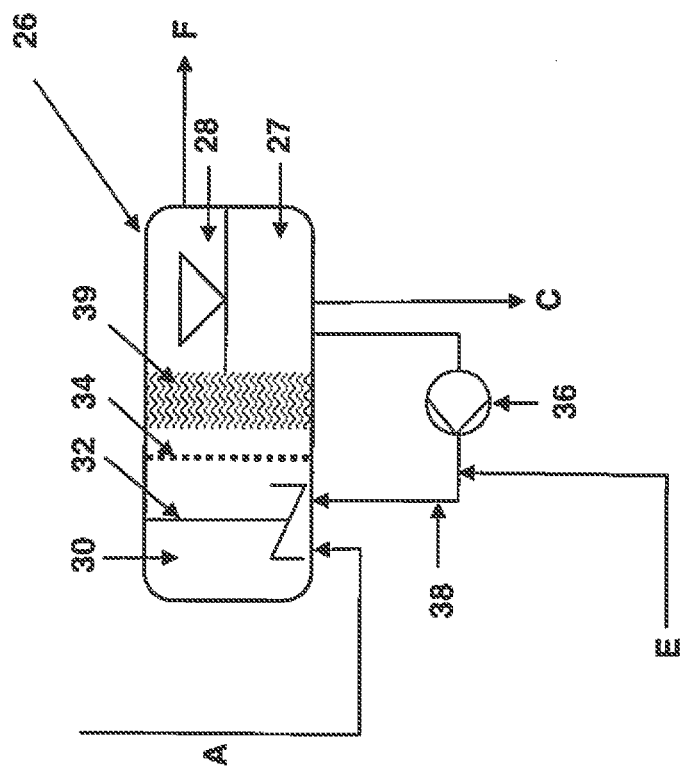
FIG. 8 shows a prewashing unit comprising a coalescer

A very basic and exemplary embodiment of the pre-washing step is shown in FIG. 8. In step pre-A) crude fluid A containing at least one non-volatile polymer, at least one volatile compound and at least one hydrophilic compound is fed to the mixing section 30 of the separating apparatus 26, which is equipped with a mixer 32 and passes through the separating wall 34 into a settling section, where the mixture separates into an aqueous phase 27 and an organic phase 28, whereby the separation is supported by means of a coalescer 29. A part of the aqueous phase 27 is removed from the separating apparatus 26 as fluid C, which is typically disposed of, with the rest being enriched with fresh water E and recycled via the recirculation line 38 by the action of recirculation pump 36 back into the mixing section 30. The organic phase 28 is removed and subjected to the subsequent process according to steps a) to c) as fluid F.

Generally, the coalescer in the pre-washing step is beneficial, but not mandatory. It helps to collect and coalesce the droplets and guides them to the phase interface which typically results in shorter residence times. Suitable examples of coalescers include structured or unstructured packings. Structured packings are for example flat plates, flat vanes, roof-shaped vanes and vanes with holes in vertical direction. The vanes or plates may be positioned rectangular or parallel to the main flow direction or with a slope, Unstructured packings am for example wire mesh, packings made of rings, spheres, cylinders, irregularly shaped geometries and weirs like distributor plates that have holes or slits, vertical plates covering a portion of the main flow path. The packings can be made of any technically feasible material, e.g. metals, glass, ceramic, coated metals, lined metals and polymeric materials like for example PTFE, ETFE, polyethylene (PE), polyetheretherketone (PEEK), Polypropylene (PP), polyamide (PA) and polyvinylidenfluoride (PVDF).

In a preferred embodiment of the invention step pre-A) is repeated at least once, preferably once.

Figure 9:
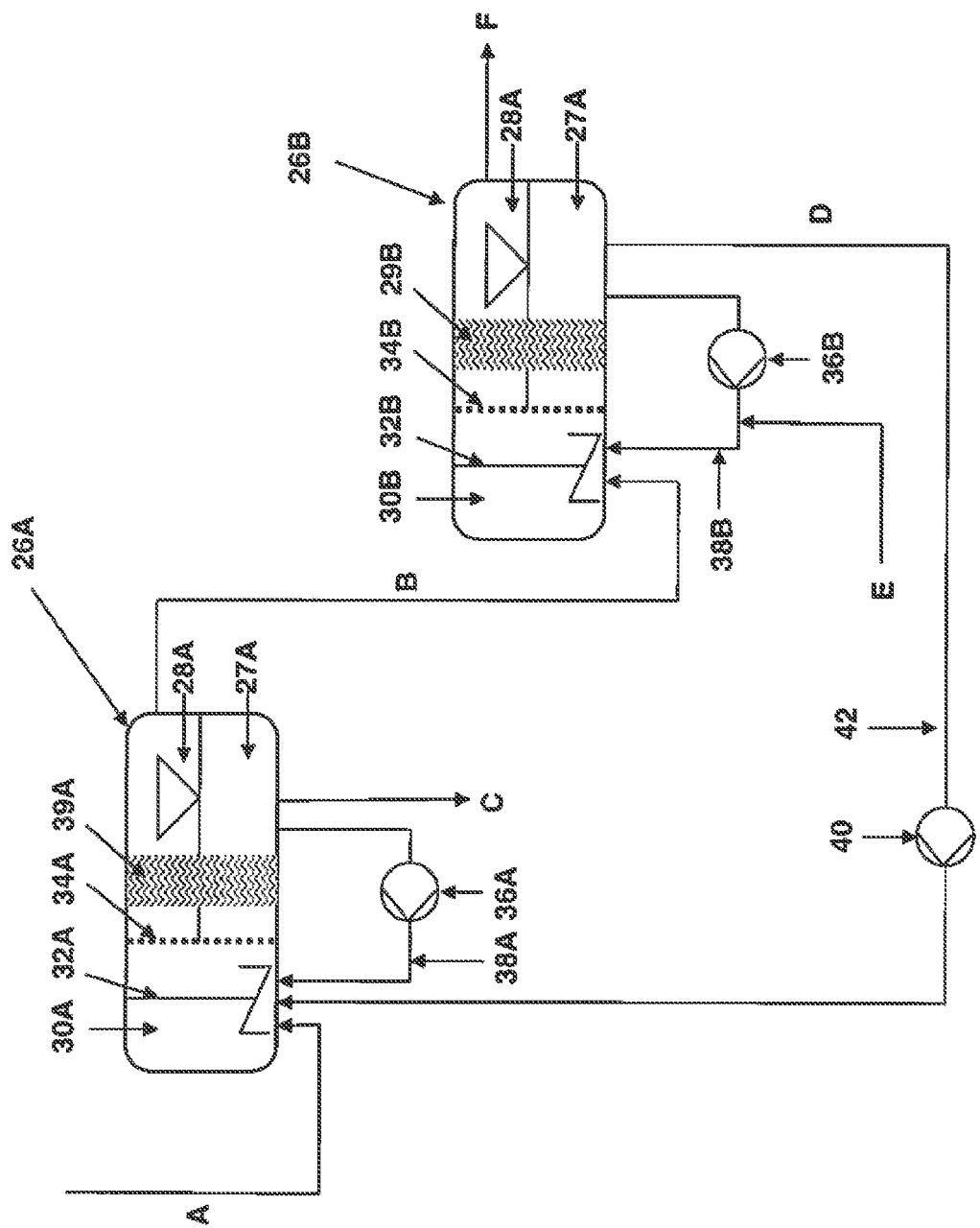
FIG. 9 shows a double stage prewashing unit

A further improved and preferred embodiment of the pre-washing step is shown in FIG. 9. In step pre-A) of this double-stage prewashing step fluid A containing at least one non-volatile polymer, at least one volatile compound and at least one hydrophilic compound is fed to the mixing section 30A of a first separating apparatus 26A, which is equipped with a mixer 32A and passes through the separating wall 34A into a settling section, where the mixture separates into an aqueous phase 27A and an organic phase 28A, whereby the separation is supported by means of a coalescer 29A. A part or the aqueous phase 27A is removed from the separating apparatus 26A as fluid C, which is typically disposed of, with the rest being recycled via the recirculation line 38A by the action of recirculation pump 36A back into the mixing section 30A. The organic phase 28A is removed and fed as fluid B to the mixing section 30B of a second separating apparatus 26B, which is also equipped with a mixer 32B and passes through the separating wall 34 into a settling section, where the mixture separates into an aqueous phase 27B and an organic phase 28E, whereby the separation is supported by means of at coalescer 29B. A part of the aqueous phase 27B is recycled to the mixing section 30A of the first separating apparatus 26A as fluid D by the action of recirculation pump 40 and recirculation line 42, with the rest being enriched with fresh water E and recycled via the recirculation fine 38B by the action of recirculation pump 36B back into the mixing section 30B of the second separating apparatus 26B. The organic phase 28 leaving the second separating apparatus 26B is subjected to the subsequent process according to steps a) to c) as fluid F. An advantage of this double-stage pre-washing step is that fluid F is substantially free of hydrophilic compounds and the amount of waste water is reduced due to recycling which results in higher concentration of hydrophilic compounds in fluid C.

In a preferred embodiment of the invention the separation is performed at temperatures of more than 40° C. The upper limit depends on the constitution of the polymer and the construction of the separating apparatus. Typically the upper limit is 125° C.

In a more preferred embodiment of the invention the separation is performed at temperatures of 40 to 110° C. preferably at temperatures of 80 to 110° C.

Depending on the composition of fluid A and the boiling points of the components thereof, the separating apparatus may be designed to be operated under pressure.

Generally, the efficiency of the pre-washing step increases with increased temperature.

In another embodiment of the invention the organic phase 28 leaving the separating apparatus may be pre-heated to facilitate the free-flow of fluid F. This purpose can also be accomplished by as heater, whereby heat exchangers as disclosed for heater 2 above are preferred.

A further improved and preferred embodiment having additional heaters for fluid A and fluid F is shown in FIG. 10 which is apart form the heaters identical to FIG. 9, Fluid A is heated before entering the separating apparatus by heater 25, and the organic phase 28 leaving the second separating apparatus 26B is heated by heater 44.

The performance of Step pre-A) is particularly advantageous for fluids F or L containing halobutyl rubbers, and in particular for chlorobutyl and bromobutyl rubbers, since crude halobutyl rubber solutions often contain high amounts of inorganic halides resulting from the halogenation of the polymer.

For example, a fluid A stemming from the bromination of butyl rubber typically contains inorganic bromide levels of 3,000 to 5,000 ppm calculated on the mass of bromobutyl rubber. Upon performance of step pre-a) this level can be reduced to less than 500 ppm, preferably to less than 300 ppm and even more preferably to less than 100 ppm.

For example, a fluid A stemming from the chlorination of butyl rubber typically contains inorganic chloride levels of 1,000 to 5,000 ppm calculated on the mass of chlorobutyl rubber. Upon performance of step pre-a) this level can be reduced to less than 500 ppm, preferably to less than 300 ppm and even more preferably to less than 100 ppm.

It was further found that the performance of step pre-A) allows to significantly reduce the water content of fluid F or fluid L compared to fluid A, which contributes to a significantly lower energy consumption for the subsequent steps.

Figure 7:
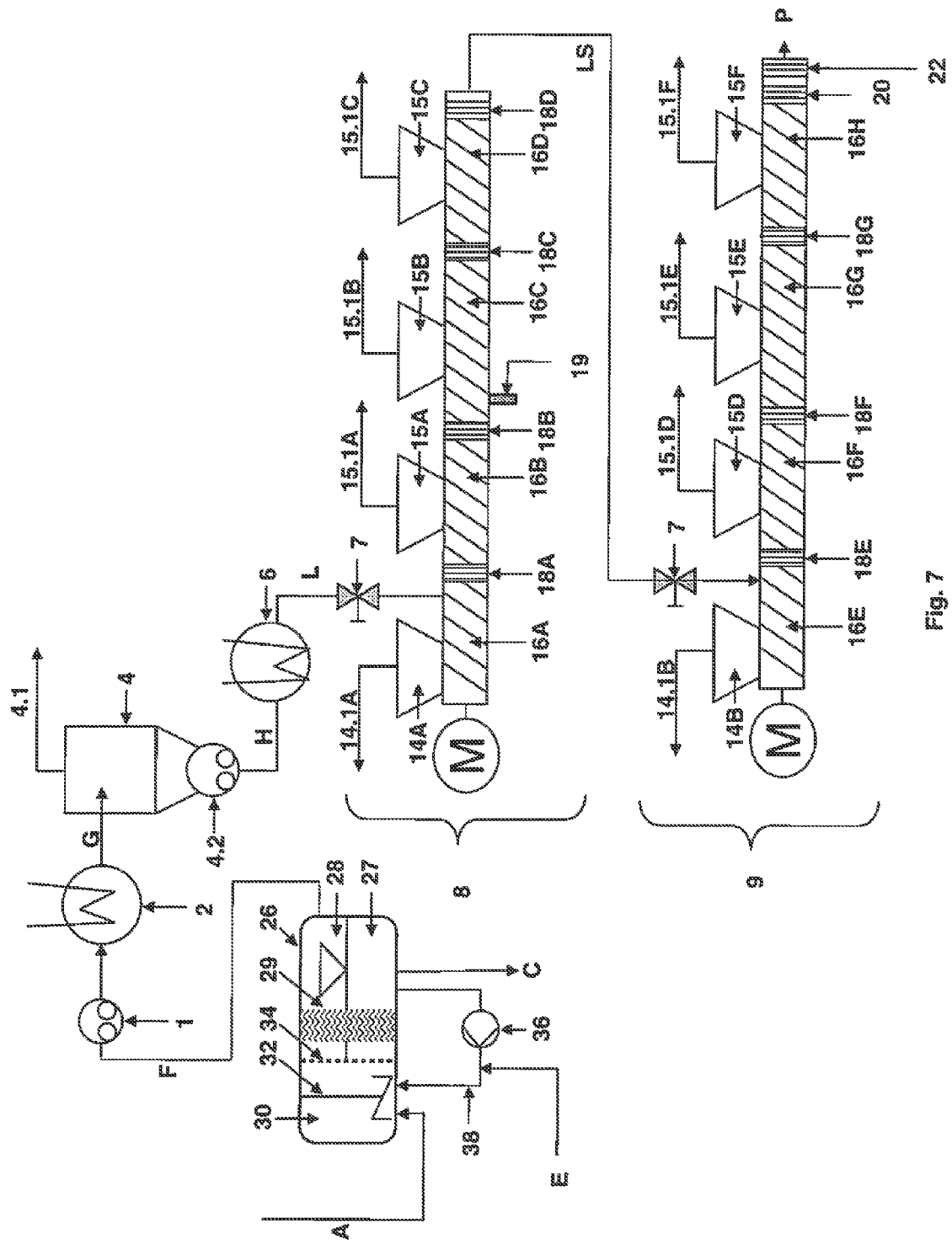

One further embodiment of the invention is shown in FIG. 7. FIG. 7 shows a basic flow chart and suitable device for the accomplishment of the process comprising the steps pre-A), A), B) and a).

In step pre-a) fluid A containing at least one non-volatile polymer, at least one volatile compound and at least one hydrophilic compound is fed to the mixing section 30 of the separating apparatus 26, which is equipped with a mixer 32 and passes through the separating wall 34 into a settling section, where the mixture separates into an aqueous phase 27 and an organic phase 28, whereby the separation is supported by means of a coalescer 29. A part of the aqueous phase 27 is removed from the separating apparatus 26 as fluid C, which is typically disposed of, with the rest being enriched with fresh water E and recycled via the recirculation line 38 by the action of recirculation pump 36 back into the mixing section 30. The organic phase 28 is removed as fluid F. In step A) Fluid F is transferred via pump 1 to the heater 2, whereby heated fluid G is obtained, Heated fluid G is fed into the degassing vessel 4. The vapors emerging from the heated fluid G are separated and removed by a vacuum line 4.1. After degassing and separation a concentrated fluid H is obtained, which is removed from the degassing vessel 4 by means of a pump 4.2.

In step B), the concentrated fluid H obtained in step A) is then passed through a reheating unit 6 to obtain a concentrated fluid L. In step a), the concentrated fluid L obtained in step B) is passed on to a drying unit and fed into the conveying section 16A of a first extruder at the feeding point 12A, whereby the first extruder represents the first drying section 8 of the drying unit. The conveying sections 16A, 16B, 16C and 16D are open to vent ports 14A, 15A, 15B and 15C. In the conveying sections a part of the solvent is evaporated and separated from the concentrated fluid L. The vapors are removed through the vent port via vapor lines 14.1, 15.1A, 15.1B and 15.1C. While passing from the conveying section 16A to the accumulating section 18D the concentrated fluid L undergoes a transition from the concentrated fluid L to the superconcentrated fluid LS. The superconcentrated fluid LS, after passing pressure regulation device 7 and tubing 23, then is fed into the conveying section 16E of the main extruder at the feeding point 12B. The conveying sections 16E, 16F, 16G and 16H are open to vent ports 14B, 15D, 15E and 15F. In the conveying sections a further part of the solvent is evaporated and separated from the superconcentrated fluid LS, The vapors are removed through the vent port via vapor lines 14.1B, 15.1D, 15.1E and 15.1F, While passing from the conveying section 16E to the accumulating section 20 and the outlet section 22 the superconcentrated fluid LS undergoes a transition to the product P, which is substantially free of volatile compounds.

It was further found that fluid A comprising halogenated butyl rubbers may obtained with significantly lower overall energy consumption by a process comprising at least the steps of I) providing a reaction medium comprising
   a common aliphatic medium comprising at least 50 wt.-% of one or more aliphatic hydrocarbons having a boiling point in the range of 45° C. to 80° C. at a pressure of 1013 hPa, and
   a monomer mixture comprising at least one monoolefin monomer, at least one multiolefin monomer and either no or at least one other co-polymerizable monomer in a mass ratio of monomer mixture to common aliphatic medium of from 40:60 to 95:5, preferably from 50:50 to 85:15 and more preferably from 61:39 to 80:20;

II) polymerizing the monomer mixture within the reaction medium to form a rubber solution comprising a rubber polymer which is at least substantially dissolved in the medium comprising the common aliphatic medium and residual monomers of the monomer mixture;

III) separating residual monomers of the monomer mixture from the rubber solution to form a separated rubber solution comprising the rubber polymer and the common aliphatic medium, IV) halogenating the rubber polymer in the separated rubber solution to obtain fluid A, a solution comprising the halogenated rubber and the common aliphatic medium.

In one embodiment and where the halogenation in step IV) is performed using a bromination agent, the bromination agent may be reoxidized using an oxidizing agent such as hydrogen peroxide.

As used herein the term "at least substantially dissolved" means that at least 70 wt.-%, preferably at least 80 wt.-%, more preferably at least 90 wt.-% and even more preferably at least 95 wt.-% of the rubber polymers obtained according to step II) are dissolved in the medium. Such a process is known from WO 2010006983 A, which is incorporated herein in its entirety.

The invention is in particular advantageous in view of energy and fresh water consumption. The products obtained are free of volatile compounds.

EXAMPLES

Analytical Methods

Water content of fluids F: The sample was put into a centrifuge and spun for 5 min at 4000 rpm at morn temperature. The water was then collected at the bottom of the vial and weighed.

Total volatiles concentration: A rubber sample was cut into small pieces of 2×2 mm size. Roughly 30 g of rubber pieces were put in an alumina crucible. The weight of the crucible and the rubber was determined. The crucible including the rubber sample was then placed in a vacuum oven at a vacuum level of 130 hPa for 60 min at a temperature of 105° C. After drying, the crucible was placed in an desiccator and let cool down for 30 min. The crucible was then weighed again. The loss in weight was determined.

Residual solvent concentration in product P: The residual solvent concentration in the product was determined by headspace gas chromatography. A weighed portion (0.5+−0.005 g) of sample was placed in a headspace vial, and, a measured amount of solvent (1,2 dichlorobenzene, ODCB) was added. The vial was sealed and shaken until the rubber was dissolved. The vial was heated until the volatile organic compounds were distributed at equilibrium between the sample and the gas phase in the vial (headspace). An aliquot of the headspace gas was injected into a stream of carrier gas, which carries the sample along a chromatographic column. Standards of known composition were used to calibrate the GC. Toluene was added to the solvent for use as an Internal Standard.

Residual water concentration in product P: The total volatiles concentration is the sum of water, solvents and monomers. As the monomer concentration is usually less then 0.0005 wt %, the water content can be determined by subtracting the solvent concentration from the total volatiles concentration.

Solvent concentration in fluids: The concentration of solvents in fluids were measured using gas chromatography. The internal standard was isooctane. The sample was diluted with toluene and then injected into the gas chromatograph.

The gas chromatography was performed on a HP 690 chromatograph, with following specifications:
    column type DB-5 of J&W, length 60 m, diameter 0.23 mm, film thickness 1.0 μm
    injector temp.: 250° C.
    detector temp.: 350° C.
    carrier gas: Helium
    column pressure: 96 kPa
    detector: FID Viscosity of fluids: The viscosity was measured in a rotational rheometer of cone-plate type. All given viscosities refer to the extrapolated zero shear viscosity.

Examples 1 to 7: Pre-Washing

General Remarks

A crude bromobutyl rubber solution, hereinafter denoted as fluid (A), was taken from a commercial bromobutyl rubber production plant, Fluid (A) contained two phases: an aqueous phase (56 wt %) and en organic phase (44 wt %). The overall ratio of bromobutyl rubber with respect to hexanes in the organic phase alone was constant throughout the examples, being 22 wt % bromobutyl rubber and about 78 wt % hexanes. The bromobutyl rubber, contained its fluid (A) had the following properties, once finished and dried: Mooney (ML 1+8, 125° C.) of 32±4, bound bromine content 1.8±0.2 wt %.

Fluid (A) further comprised certain additives, the concentration being given as mass fraction with respect to the rubber mass (phr=parts per hundred parts of rubber):
    ESBO: 1 to 1.6 phr, calcium stearate 1.3 to 1.7 phr, Irganox 0.03 to 0.1 phr The aqueous phase had a typical pH value of 9.5. In addition to the additives, fluid (A) comprised inorganic components like bromides, chlorides, calcium, sodium, aluminum and small amounts of other inorganic components.

The experiments in examples 1 to 7 were carried out using a glass vessel having a volume of 11. Experiments were performed batchwise. The vessel was equipped with a stirrer.

The water content in the organic phase was determined as described above.

Example 1

A sample of fluid (A) was placed in the stirred vessel and stirred for 10 min at 58° C. Then the stirrer was stopped and the sample was left for settling. After 30 min the organic phase was separated from the aqueous phase and the residual water content measured in the centrifuge. The residual amount of water was 35 vol %.

Example 2

160 ml of fluid (A) were placed in the vessel and 240 ml of water were added. The mixture was stirred for 10 min at 58° C. Then the stirrer was stopped and the mixture was left for settling. After 30 min the organic phase was separated from the aqueous phase and the residual water content measured in the centrifuge. The residual amount or water in the organic phase was 10.0 vol %.

Example 3

160 ml of fluid (A) were placed in the vessel and 240 ml of water were added. The mixture was stirred for 10 min at 90° C. Then the stirrer was stopped and the mixture was left for settling. After 30 rain the manic phase was separated from the aqueous phase and the residual water content measured in the centrifuge. The residual amount of water in the organic phase was 65 vol %.

Example 4

160 ml of fluid (A) were placed in the vessel and 240 ml of water were added. The mixture was stirred for 10 min at 105° C. Then the stirrer was stopped and the mixture was left for settling, After 30 min the organic phase was separated from the aqueous phase and the residual water content measured in the centrifuge. The residual amount of water in the organic phase was 1.5 vol %.

Example 5

A sample of fluid (A) was taken and left sealing. The aqueous phase and the organic phase were analyzed. The aqueous phase contained 4940 mg/l of inorganic bromides. The organic phase contained 20 wt % bromobutyl rubber, 68 wt % hexane and 12 wt % water. The total inorganic bromine concentration in the organic phase was 0.15 wt % (1500 ppm).

Example 6

100 ml of the organic phase obtained in example 5 was placed in the stirred vessel described above. 40 ml of water added. The resulting mixture was stirred for 15 min at ambient temperature and then left sealing for 30 min. The resulting aqueous phase contained 2280 mg/l of inorganic bromides. The organic phase contained a total of 0.04 wt % (400 ppm) of inorganic bromides.

Example 7

100 ml of the organic phase obtained in example 5 was placed in the stirred vessel described above. 80 ml of water added. The resulting mixture was stirred for 15 min at ambient temperature and then left settling for 30 rain. The resulting aqueous phase contained 1100 mg/l of inorganic bromides. The organic phase contained a total of 0.025 wt % (250 ppm) of inorganic bromides.

Examples 8 to 27: Concentration and Direct Evaporation

The fluid (F) containing butyl rubber used as a feedstock for examples 7 to 28 was obtained from two different sources:

Preparation of Fluid F1

A crude butyl rubber solution was taken from a commercial production plant, allowed to settle several hours and the organic phase separated from the bulk aqueous phase. The organic phase was then used to perform the experiments as fluid (F1). Fluid (F1) contained 20 wt % rubber, 70 wt % hexanes and 10 wt % water calculated on 100 wt % of these three components. The concentration of additives with respect to the bromobutyl rubber fraction was:
    ESBO: 1 to 1.6 phr. Calcium stearate: 1.3 to 1.7 phr and Irganox: 0.03 to 0.1 phr The bromobutyl rubber, dissolved in the fluid (F1), had the following properties, once Finished and dried: Mooney (ML 1+8, 125° C.) of 28 to 36, Bound bromine content of 1.6 to 2.0 wt %.

The viscosity of Fluid at 60° C. was 1,760 mPa*s

Preparation of Fluid F2

Commercially available bromobutyl rubber with a Mooney (ML 1+8, 125° C.) 28 to 36, a bromine content of 1.6 to 2.0 wt % and an organic volatile concentration of <0.7 wt % was dissolved in technical hexane whereby a fluid (F2) was obtained containing 20 wt % rubber, 79 wt % hexanes and 1 wt % water calculated on 100 wt % of these three components The concentration of additives with respect to the bromobutyl rubber fraction was:

ESBO: 1 to 1.6 phr, Calcium steatite 1.3 to 1.7 phr and Irganox: 0.03 to 0.1 phr Examples 8 to 12: Concentration The Concentrator Unit The concentrator unit used for the examples was similar to the one shown in FIG. 6. A piston pump was used to pump the fluid F1, which was prepared as described above, to heater (2). The heater (2) was a single tube-in-tube type heat exchanger. The internal pipe was equipped with a static mixer of Kenies type, the diameter of the internal pipe was 15 mm. The tube was heated by as tube shaped shell. The heating medium was heating oil (Marlotherm). A pressure relief valve (3) was installed prior to the degassing vessel (4), the pressure upstream of the valve was controlled automatically to a set point value. This set point was chosen so that boiling in the heated fluid (G1) was prevented. The heated fluid (G) was introduced into the degassing vessel (4) from the top. The conical outlet of the degassing vessel (4) was equipped with a pump (42), which was a combination of an extruder type pump and a gear pump. This combination had the advantage of being able to handle high viscosities and to build up high pressures. Samples were taken from the concentrated fluid (H) to investigate the concentration and viscosity after the concentration stage.

Example 8

The heating medium of the heater 2 was set to 125° C., the pressure in the separating vessel 4 was atmospheric (1013 hPa). The concentrated fluid H in the bottom of the separating vessel 4 was a free flowing foamy liquid, as observed through a sight glass and could be easily conveyed from the separating vessel using the extraction pump 4.2 as described above. The concentrated fluid H had a hexane concentration of 71 wt % and a viscosity of 4,840 mPa*s measured at 60° C.

Example 9

The feedstock fluid F1, and the concentration unit were the some as in example 8. The heating medium of the heater 2 was set to 155° C. the pressure in the separating vessel 4 was atmospheric (1013 hPa). The concentrated fluid H in the bottom of the separating vessel 4 was a free flowing foamy liquid, as observed through a sight glass and could be easily conveyed from the separating vessel using the extraction pump 4.2 as described above. The concentrated fluid H had a hexane concentration of 53 wt % and a viscosity of 65,000 mPa*s measured at 60° C.

Example 11

The feedstock, fluid F1, and the concentration unit were the same as in example 8. The heating medium of the heater 2 was set to 170° C., the pressure in the separating vessel 4 was atmospheric 1013 hPa). The concentrated fluid H in the bottom of the separating vessel 4 was a free flowing foamy liquid, as observed through a sight glass and could be conveyed from the separating vessel without plugging or product buildup using the extraction pump 4.2 as described above. The concentrated fluid H had a hexane concentration of 42 wt % and a viscosity of 317,700 mPa*s measured at 60° C.

Example 11

The feedstock, fluid F1, and the concentration unit were the same as in example 8. The heating medium of the heater 2 was set to 170° C. the pressure in the separating vessel 4 was 500 hPa. The concentrated fluid H in the bottom of the separating vessel 4 was a free flowing foamy liquid, as observed through a sight glass and could be conveyed from the separating vessel using the extraction pump 4.2 as described above. Only little product buildup was observed in the conical outlet section of the separating vessel 4. The concentrated fluid H had a hexane concentration of 20 wt % and a viscosity of 7,600,000 mPa*s measured at 60° C.

Example 12

The feedstock, fluid F1, and the concentration unit were the same as in example 8. The heating medium of the heater 2 was set to 170° C., the pressure in the separating vessel 4 was 230 hPa. The concentrated fluid H in the bottom of the separating vessel 4 was a free flowing foamy liquid, as observed through a sight glass and could be conveyed from the separating vessel using the extraction pump 4.2 as described above. Some product buildup was observed in the conical outlet section of the separating vessel 4. The concentrated fluid H had a hexane concentration of 15 wt % and a viscosity of 15,600,000 mPa*s measured at 60° C.

The results of examples 8 to 12 showing the performance of the concentration stage are summarized in table 1.

TABLE 1

| Example | T [° C.] at heater 2* | P [hPa] in degassing vessel 4 | Hexane content [wt %] of fluid H* | Viscosity [mPa * s] at 60° C. of fluid H |
|---|---|---|---|---|
| 8 | 125° C. | 1013 | 71% | 4,840 |
| 9 | 155° C. | 1013 | 53% | 65,000 |
| 10 | 170° C. | 1013 | 42% | 317,700 |
| 11 | 170° C. | 500 | 20% | 7,600,000 |
| 12 | 170° C. | 230 | 15% | 15,600,000 |

*temperature set for the heating medium

Example 13. Concentration and Extrusion

The Device

The device used for the examples was similar to the one shown in FIG. 6. A gear pump was used to pump the fluid F to heater 2. The heater 2 was a shell-and-tube type heat exchanger. The tubes are heated internally by steam. The fluid F flows around the tubes guided by vanes to enhance heat transfer, fluid and vanes are contained in a tube Heating was accomplished by 60° C. hot steam. A pressure relief valve 3 was installed prior to the degassing vessel 4, the pressure upstream of the valve was controlled automatically to a set point value. This set point was chosen so that boiling in the heated fluid G was prevented. The heated fluid G was introduced into the degassing vessel 4 from the top. The conical outlet of the degassing vessel 4 was equipped with a gear pump. The concentrated fluid H was then passed through a reheating unit 6, which is of similar design than described above: a shell-and-tube type heat exchanger heated by steam, whereby steam is inside the tubes and the fluid H flows around the tubes. Heating was accomplished by 160° C. hot steam, which was a single tube-in-tube type heat exchanger. The internal pipe diameter was 20 mm, the internal pipe was equipped with a static mixer of type SMX. Heating was accomplished by a tube shell using a heating oil (Marlotherm) as heating medium.

Thereafter, the concentrated fluid L was fed into the drying unit consisting of a first extruder and a main extruder which are connected via a simple tube with a pressure retention valve.

The first extruder of the drying unit was a counter-rotating intermeshing twin screw extruder with a screw diameter of 57 mm and a screw length of 1000 mm.

The main extruder of the drying unit was a co-rotating twin screw extruder with a screw diameter of 58 mm and a screw length of 3120 mm.

Both extruders further comprised a nozzle as a pressure control device 7, (see FIG. 5) upstream the feeding point of the extruder.

The first extruder comprises two degassing sections, whereby the first degassing section is a backward degassing section, whereby the feeding point 12 was located at the first extruder degassing section, whereby the first extruder degassing section comprised a conveying section 16A, a rear vent port 14A connected to a vapor line 14.1A in upstream direction and whereby the extruder unit further comprised one downstream extruder degassing section each comprising a conveying section 16B, a vent port 15A, whereby the vent port 15A is connected to a vapour line 15.1A, and whereby the extruder unit further comprised an outlet section 18C.

The main body of the first extruder could be heated by steam to control the temperature.

The rear vent port 14A was connected to a dry running vacuum pump and a condenser via a first vapor line 14.1. The other vapor lines 15.1A were connected downstream to the same vacuum pump as vapour line (14.1).

A sight glass was installed in the vent ports (14.1A) and 15.1B to allow the observation of the conveying behavior and of the product properties in the conveying section 16C.

The outlet kneading zone 18 was equipped with kneading blocks.

The main extruder comprises six degassing sections, whereby the transfer line 23 is a simple heated tube. The first degassing section is a backward degassing section, comprising a conveying section 16D, a rear vent port 14B connected to a vapor line 14.1B in upstream direction and whereby the extruder unit further comprised five downstream extruder degassing sections each comprising a conveying section 16E to 16I, connected to a vent section 15C to 15G, whereby the vent ports 15C to 15G are connected to a vapour line 15.1C to 15.1G, and whereby each of the conveying sections was terminated by an accumulating section 18D to 18G and 20, and whereby the extruder unit further comprised an outlet section 22.

The main extruder consists of 13 barrel sections, which could be heated by steam.

The rear vent port 14.1B was connected to a dry running vacuum pump and a condenser via a first vapor line 14.1B. The vent port 15C was connected to the same vapor line 14.1B.

Vent port 15D was equipped via a stuffer screw to the vent line 15.1D, that was connected to vapor line 14.1B.

The vent ports 15E to 15G were equipped with shifter screws, the vent lines 15.1E to 15.1G were all connected and ended at the same two stage dry running vacuum pump and downstream condenser.

A sight glass was installed in the vent ports (14B) and 15C to allow the observation of the conveying behavior and of the product properties in the conveying sections 16D and 16E.

The accumulating sections 18D to 18I were made of back conveying elements, kneading blocks and crumb formation elements. Accumulation zones 18E to 18I were designed to allow the injection of additives and stripping agent.

The outlet kneading section 20 was equipped with kneading blocks.

The outlet section 22 was equipped with a plate type pressure retention zone. The product was formed into crumbs at the outlet of the screw by special screw elements and the rotating action of the screws.

Example 13

Fluid F contained about 22% of a brominated butyl rubber, <5% water, <2% of additives (mainly calcium stearate and ESBO), the remainder was hexane. The fluid F was pumped at a rate of 190 kg/h, pressurized to 13 bar, heated to 145° C. and flashed into a flash tank 4 at atmospheric pressure, thereby producing a concentrated fluid H comprising a rubber concentration of 50% and a water content of less than 2%. The concentrated fluid H was then pressurized to 12 bar and heated to 125° C. This heated fluid L was then flashed into the degassing section 16A of the first extruder at a pressure of 400 mbar. The fluid is then conveyed further through the extruder through the second degassing section 16B at the same pressure than section 16A. The rubber concentration at the outlet of the first extruder was 80%, water content less than 1%. At the outlet of the first extruder the fluid LS had a temperature of 120° C. and was pressurized to 25 bar. This superconcentrated fluid LS was then flashed into the degassing section 16D of the main extruder, Degassing sections 16D and 16E and 16F were operated at 100 mbar pressure. The barrel temperature in the vent section 16D was set to 100-120° C. by steam heating. The pressures in the vent sections 16G, 16H and 16I were set to 10 mbar.

Nitrogen at a rate of each 0.5 kg/hr was injected into accumulation section 18E and 18F, water containing about 50% of calcium stearate was injected at a rare of each 1.6 kg/h into accumulation sections 18G and 18H.

The rubber temperature at the outlet of the extruder was 160° C., the volatile content was less than 0.2%, the water content was less than 0.1%.

The feed extruder was operated at 250 rpm, the main extruder at 80 rpm, the rubber throughput was 40 kg/h.

The reference numerals used hereinbefore are summarized below:
1 pump
2, 2A, 2B heater
3 pressure control device
4, 4A, 4B degassing vessel
4.1, 4.1A, 4.1B vapor line
4.2, 4.2A, 4.2B pump
5, 5A, 5B pump
6 reheating unit
7 pressure control device
8 first drying section
9 main extruder section
10 feeding point (kneader)

11 kneading section
12 feeding point (extruder)
13 vent dome
13.1 vapor line
14 rear vent port (upstream)
14.1 vapor line
15, 15A, 15B, 15B, 15C vent port (downstream)
15.1, 15.1A, 15.1B, 15.1C vapor line
16, 16A, 16B, 16C, 16D conveying section (downstream)
18, 18A, 18B, 18C, 18D accumulating section
19, 19A, 19B side feeder
20 last accumulating section
22 outlet section
23 tubing
25, 44 heater
26, 26A, 25B separating vessel
27, 27A, 27B aqueous phase
28, 28A, 28B organic phase
29, 29A, 29B coalescer
30, 30A, 30B mixing section
32, 32A, 32B mixer
34, 34A, 34B separating wall
36, 36A, 36B recirculation pump
38, 38A, 38B recirculation line
40 recirculation pump
42 recirculation line
50A, 50B shaft
51 kneading element
52 conveyor screw
60 water basin
A crude fluid A
C waste water
D aqueous phase for recycling
E fresh water
fluid F
heated fluid H
concentrated fluid H
concentrated fluid L
LS superconcentrated L
P product
W underwater processing device

What is claimed is:

1. A process of removing volatile compounds from a concentrated fluid containing at least one non-volatile polymer and at least one volatile compound, the process comprising:
feeding a concentrated fluid comprising 10 wt % to 80 wt % of at least one synthetic rubber and 20 wt % to 90 wt % of at least one volatile compound into at least one drying unit, wherein:
the at least one synthetic rubber and the at least one volatile compound comprise up to 90% to 100% of the total mass of the concentrated fluid, and
the drying unit comprises, in a flow direction:
I) a first drying section, and
II) a main extruder section comprising:
an extruder degassing section comprising a conveying section and a vent port with one or more vapor lines, and
an accumulating section and an outlet section, whereby
the first drying section is a first extruder, and the main extruder section is a main extruder, wherein the main extruder has a larger cross sectional area than the first extruder;
removing the at least one volatile compound via the vent ports and vapor lines to dry the concentrated fluid and obtain, at the outlet section of the main extruder, a product substantially free of volatile compounds.

2. The process pursuant to claim 1, wherein the at least one synthetic rubber is at least one halogenated butyl rubber.

3. The process pursuant to claim 1, further comprising:
producing the concentrated fluid from a fluid F that contains from 3 to 50 wt % of the synthetic rubber and from 60 to 97 wt % of the volatile compounds, whereby the aforementioned components add up to 90 to 100 of the total mass of the fluid F, and
producing the concentrated fluid from the Fluid F by heating the fluid F and degassing the fluid F.

4. The process pursuant to claim 1, wherein the vent ports comprise stuffer screws.

5. The process pursuant to claim 1, further comprising adjusting the main extruder to have a dimensionless throughput $V/(n*d^3)$ of 0.01 to 0.7.

6. The process pursuant to claim 1, wherein the vent ports are configured for preventing concentrated fluid from coming out of the vent ports.

7. The process pursuant to claim 1, further comprising adding a stripping agent to the concentrated fluid.

8. The process pursuant to claim 1, wherein the outlet section comprises an underwater processing device.

9. A process of removing volatile compounds from a concentrated fluid containing at least one non-volatile polymer and at least one volatile compound, the process comprising:
preparing a concentrated fluid by a process comprising:
A) treating a fluid F comprising volatile compounds in at least one concentrator unit comprising at least a heater, a degassing vessel and a vapor line, the treating comprising heating the fluid F in the heater, feeding the heated fluid into the degassing vessel, and removing at least a portion of the volatile compounds via the vapor line to obtain a fluid H, and
B) reheating the fluid H from step A) in at least one reheating unit to obtain a concentrated fluid comprising 10 wt % to 80 wt % of at least one synthetic rubber and 20 wt % to 90 wt % of at least one volatile compound;
feeding the concentrated fluid into at least one drying unit, wherein:
the at least one synthetic rubber and the at least one volatile compound comprise up to 90% to 100% of the total mass of the concentrated fluid, and
the drying unit comprises, in a flow direction:
I) a first drying section, and
II) a main extruder section comprising:
an extruder degassing section comprising a conveying section and a vent port with one or more vapor lines,
an accumulating section, and
an outlet section,
whereby
the first drying section is either a kneader or a first extruder, and the main extruder section is a main extruder;
removing the at least one volatile compound via the vent ports and vapor lines to dry the concentrated fluid and obtain, at the outlet section of the main extruder, a product substantially free of volatile compounds.

10. The process pursuant to claim 9, further comprising preparing the fluid F by a process comprising:
treating a crude fluid A in at least one pre-washing unit comprising at least a separating apparatus, wherein the treating comprises mixing the crude fluid A with water to obtain an organic phase comprising primarily non-volatile polymer and volatile organic compounds, and an aqueous phase comprising primarily water and hydrophilic compounds, separating the organic phase from the aqueous phase in the separating apparatus, using the organic phase as fluid F, and removing at least a part of the aqueous phase from the separating apparatus.

11. The process pursuant to claim 10, further comprising preparing the crude fluid A by a process comprising:
    I) providing a reaction medium comprising
        a common aliphatic medium comprising at least 50 wt.-% of one or more aliphatic hydrocarbons having a boiling point in the range of 45° C. to 80° C. at a pressure of 1013 hPa, and
        a monomer mixture comprising at least one monoolefin monomer, at least one multiolefin monomer and either no or at least one other co-polymerizable monomer in a mass ratio of monomer mixture to common aliphatic medium of from 40:60 to 95:5;
    II) polymerizing the monomer mixture within the reaction medium to form a rubber solution comprising a rubber polymer which is at least substantially dissolved in the medium comprising the common aliphatic medium and residual monomers of the monomer mixture;
    III) separating residual monomers of the monomer mixture from the rubber solution to form a separated rubber solution comprising the rubber polymer and the common aliphatic medium, and
    IV) halogenating the rubber polymer in the separated rubber solution to obtain the crude fluid A, a solution comprising halogenated rubber, and the common aliphatic medium.

12. The process pursuant to claim 11, wherein:
    the halogenating comprises halogenating the rubber polymer using a bromination agent, and
    after use of the bromination agent, the process further comprises at least partially reoxidizing the bromination agent using an oxidizing agent.

13. The process pursuant to claim 9, further comprising preparing the concentrated fluid by a process comprising:
    treating a crude fluid A comprising non-volatile polymer, volatile organic compounds and hydrophilic compounds in at least one pre-washing unit comprising at least a separating apparatus, wherein the treating comprises mixing the crude fluid A with water to obtain an organic phase comprising primarily the non-volatile polymer and the volatile organic compounds, and an aqueous phase comprising primarily water and the hydrophilic compounds, separating the organic phase from the aqueous phase in the separating apparatus, using the organic phase as the concentrated fluid, and removing at least a part of the aqueous phase from the separating apparatus.

14. A process of removing volatile compounds from a concentrated fluid containing at least one non-volatile polymer and at least one volatile compound, the process comprising:
    heating a fluid F that contains 3 to 50 wt % synthetic rubber and 60 to 97 wt % volatile compounds, whereby the aforementioned components add up to 90 to 100% of the total mass of the fluid F;
    degassing the fluid F to produce a concentrated fluid comprising 10 wt % to 80 wt % of at least one synthetic rubber and 20 wt % to 90 wt % of at least one volatile compound;
    feeding the concentrated fluid into at least one drying unit, wherein:
        the at least one synthetic rubber and the at least one volatile compound comprise up to 90% to 100% of the total mass of the concentrated fluid, and
        the drying unit comprises, in a flow direction:
            I) a first drying section, and
            II) a main extruder section comprising:
                an extruder degassing section comprising a conveying section and a vent port with one or more vapor lines, and
                an accumulating section, and
                an outlet section,
            whereby
                the first drying section is either a kneader or a first extruder, and the main extruder section is a main extruder;
    removing the at least one volatile compound via the vent ports and vapor lines to dry the concentrated fluid and obtain, at the outlet section of the main extruder, a product substantially free of volatile compounds.

* * * * *